United States Patent
Johansson et al.

(10) Patent No.: US 10,489,838 B2
(45) Date of Patent: *Nov. 26, 2019

(54) METHOD FOR USING CUSTOMER ATTRIBUTES TO SELECT A SERVICE REPRESENTATIVE

(71) Applicant: Amazon Technologies, Inc., Seattle, WA (US)

(72) Inventors: Jesper Mikael Johansson, Redmond, WA (US); Donald Lloyd Kaufman, Kirkland, WA (US); Joshua Brandon Kilpatrick, Seattle, WA (US); George Nikolaos Stathakopoulos, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 190 days.

This patent is subject to a terminal disclaimer.

(21) Appl. No.: 15/583,874

(22) Filed: May 1, 2017

(65) Prior Publication Data
US 2017/0236176 A1    Aug. 17, 2017

Related U.S. Application Data

(63) Continuation of application No. 14/222,544, filed on Mar. 21, 2014, now Pat. No. 9,641,686.

(51) Int. Cl.
*G06Q 30/06* (2012.01)
*G06Q 10/06* (2012.01)
(Continued)

(52) U.S. Cl.
CPC ... *G06Q 30/0613* (2013.01); *G06Q 10/06311* (2013.01); *H04M 3/5233* (2013.01); *H04M 3/5235* (2013.01); H04M 2250/12 (2013.01)

(58) Field of Classification Search
CPC ............ H04M 3/5235; H04M 3/5233; H04M 2250/12; G06Q 10/06311; G06Q 30/0613
(Continued)

(56) References Cited

U.S. PATENT DOCUMENTS 8,160,234 B2 *  4/2012  Diethorn ............. H04M 3/5232
                                              379/142.07
9,641,686 B1 *  5/2017  Johansson ........... H04M 3/5235
(Continued)

OTHER PUBLICATIONS

"Be heard anywhere?" retrieved Feb. 28, 2014, http://jawbone.com/headsets/era, 1 page.
(Continued)

*Primary Examiner* — Harry S Hong
(74) *Attorney, Agent, or Firm* — Davis Wright Tremaine LLP

(57) ABSTRACT

A customer submits a request for assistance to a customer service. Accordingly, the customer service may access a customer database to obtain one or more customer preferences that can be used to select a service representative. If the customer database does not include these preferences, the customer service may utilize one or more customer attributes to calculate these one or more customer preferences. Subsequently, the customer service may access a service representative database and select a service representative based at least in part on the one or more customer preferences. The customer service may transmit the request to the selected service representative to enable the service representative to assist the customer.

18 Claims, 15 Drawing Sheets

(51) Int. Cl.
*H04M 3/51* (2006.01)
*H04M 3/523* (2006.01)

(58) Field of Classification Search
USPC ............ 379/265.01, 265.02, 265.09, 265.14, 379/266.01, 266.03
See application file for complete search history.

(56) References Cited

U.S. PATENT DOCUMENTS

| | | |
|---|---|---|
| 2002/0191775 A1 | 12/2002 | Boies et al. |
| 2006/0243797 A1 | 11/2006 | Apte et al. |
| 2009/0190740 A1 | 7/2009 | Chishti et al. |
| 2010/0128867 A1 | 5/2010 | Vendrow et al. |
| 2013/0051545 A1 | 2/2013 | Ross et al. |
| 2013/0051548 A1 | 2/2013 | Chavez |
| 2014/0169548 A1 | 6/2014 | McDaniel et al. |
| 2015/0071415 A1 | 3/2015 | Thomson et al. |
| 2015/0256674 A1 | 9/2015 | Iwasaki et al. |

OTHER PUBLICATIONS

"What is Noiseassassin 4.0?" Jawbone, retrieved Feb. 28, 2014, http://jawbone.com/store/buy/era#faqs, 1 page.

Agarwal et al, "Estimating Rates of Rare Events with Multiple Hierarchies Through Scalable Log-linear Models," Proceedings of the 16th ACM SIGKDD International Conference on Knowledge Discovery and Data Mining, Jul. 25, 2010, 10 pages.

Chapelle et al., "An Empirical Evaluation of Thompson Sampling," Advances in Neural Information Processing Systems (NIPS), Dec. 12-17, 2011, 9 pages.

Steiner, "Making Call Centers Really Hum," Jan. 26, 2011 [retrieved Feb. 28, 2014], http://www.forbes.com/forbes/2011/0214/entrepreneurs-kelly-conway-software-eloyalty-your-pain.html, 5 pages.

* cited by examiner

700

Customer Database

| Customer ID | Language | Gender | Location | Preference |
|---|---|---|---|---|
| Customer A | English, Spanish | Male | San Juan, PR, USA | Region |
| Customer B | English, Russian | Female | New York, NY, USA | Language: Russian |
| Customer C | Italian, Mandarin | Female | Venice, Italy | Region |
| Customer D | English, Swahili | Male | Seattle, WA, USA | Opposite Gender |

FIG. 7

Service Representative Database

| Representative ID | Language | Gender | Location |
|---|---|---|---|
| Representative A | English | Female | Billings, MT, USA |
| Representative B | English, Russian | Male | Topeka, Kansas |
| Representative C | English, Mandarin, Thai | Female | London, England |
| Representative D | English, Spanish | Female | Cerro Gordo, PR, USA |

FIG. 8

METHOD FOR USING CUSTOMER ATTRIBUTES TO SELECT A SERVICE REPRESENTATIVE

BACKGROUND

Service providers often employ service representatives to provide customer assistance and support to customers and other users of the service. These service representatives may be permitted to utilize a computing device provided by the service provider in remote locations, thereby increasing the potential range and availability of these service representatives over various regions. Additionally, having service representatives in remote locations may reduce the infrastructure cost for a service provider, as the service provider may no longer be required to maintain centralized office space and to provide other amenities for these service representatives. Despite their many advantages, ensuring that service representatives provide a secure and properly tailored environment for customer interactions may be difficult. For example, despite their best efforts to avoid it, unauthorized persons may utilize the computing device provided by the service provider and potentially obtain customer information and interact with customers and other users of the service. Further, service representatives may utilize the computing device in an undesirable environment, where others may be present or where the environment is not conducive to customer interaction. Additionally, a customer, upon submitting a request for assistance, may be connected to a service representative at random, such that the potential exists that the customer may not be comfortable with the selected service representative. These, in turn, may result in a potentially negative customer experience.

BRIEF DESCRIPTION OF THE DRAWINGS

Various embodiments in accordance with the present disclosure will be described with reference to the drawings, in which:

FIG. 7 shows an illustrative example of a customer database comprising a plurality of customer entries in accordance with at least one embodiment;

FIG. 8 shows an illustrative example of a service representative database comprising a plurality of service representative entries in accordance with at least one embodiment;

DETAILED DESCRIPTION

Figure 1:
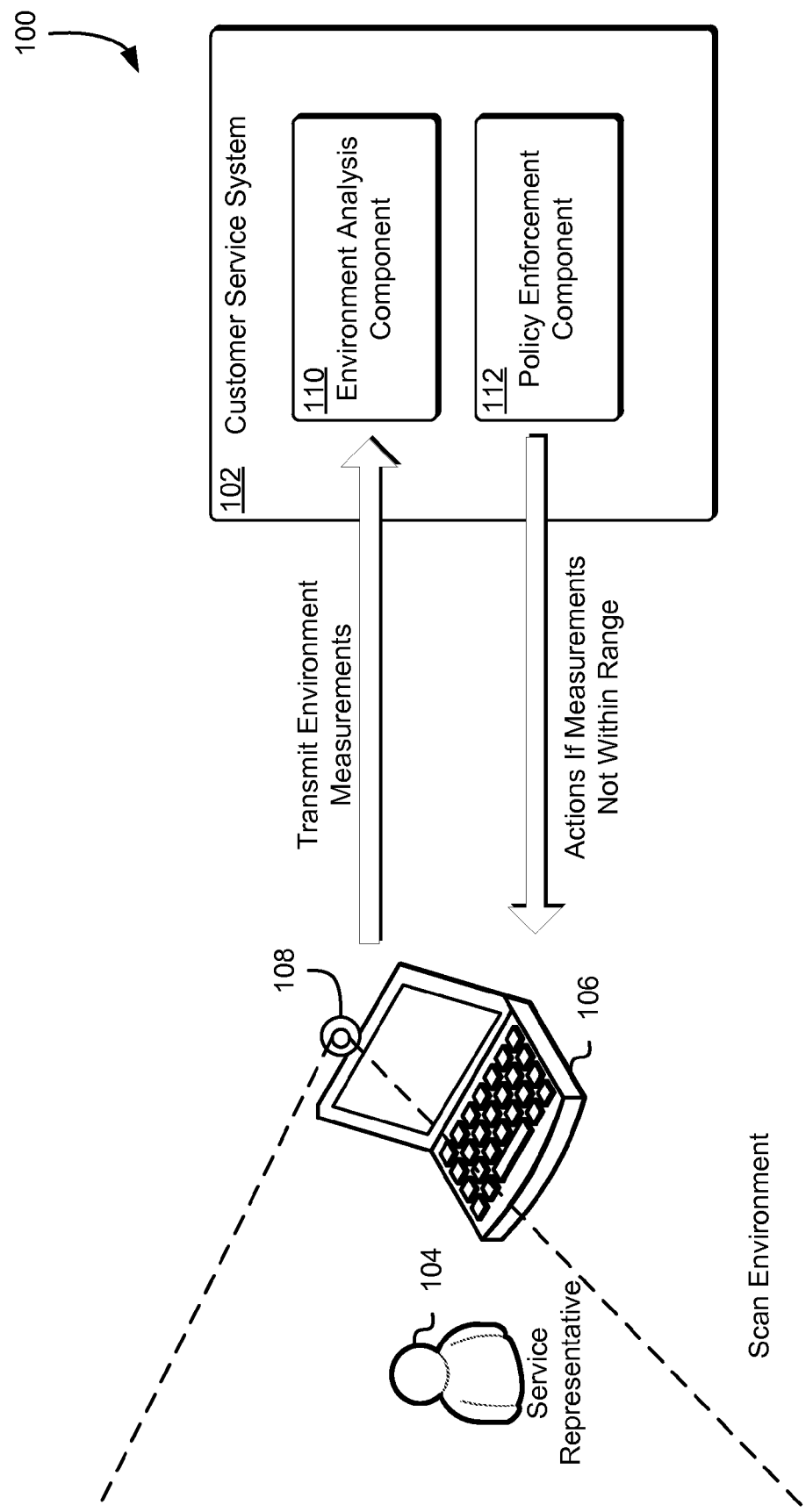
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the use of multiple sensors on a computing device provided to a service representative to manage the service representative's interactions with customers and to a method for matching a customer to a service representative based on customer and service representative attributes. In an embodiment, an entity (e.g., an individual located in a remote location) initializes a service representative environment application to interact with a customer(s) of the service provider. The service representative environment application may be installed on a computing device used by a service representative in remote (relative to the service provider) locations and which may be configured to enable interactions with the customer(s) of the service provider. The entity may be a service representative located in a remote location, employed by the service provider, to provide customer assistance to the customer(s) of the service provider.

When the entity launches the service representative environment application on the computing device, the application may interact with a component(s) of or otherwise associated with the computing device to gather environmental measurements related to the surrounding environment in which the computing device is used. The components may include, for example, a microphone, camera, light sensor, motion sensor, global positioning system antennae and/or other device. The environmental measurements may include facial recognition details, sound levels, global positioning system (GPS) coordinates, light intensity, motion detection characteristics and the like. In some embodiments, the service representative environment application may transmit these measurements to an environment analysis component of the customer service system, to determine whether the surrounding environment is suitable for customer interaction. For instance, the environment analysis component may be configured to compare the received measurements to a set of service baseline values, established by the service provider as being acceptable, to determine whether the surrounding environment is acceptable for enabling a service representative to interact with a customer(s) of the service provider. If any of the received measurements are outside of these acceptable values, the environment analysis component may transmit a command(s) to a policy enforcement component, such as through one or more application programming interface (API) calls to the component, to cause the policy enforcement component to take a mitigating action(s). For instance, the command(s) may cause the policy enforcement component to transmit a second set of commands to the service representative environment application, which may cause the application to prevent the entity from interacting with any customers of the service provider.

In an embodiment, the customer service system is configured to obtain customer information from a customer in order to provide customized customer support in the event that the customer requires assistance from a service representative. For instance, when a customer obtains a device from the service provider, the customer may be required to create a new customer account. In order to create this new customer account, the customer may be required to and/or provided the opportunity to provide certain customer information, such as the customer's name, address, age, gender, preferred languages and the like. Additionally, or alternatively, the customer service system may obtain customer information through alternative methods, such as through the customer's purchase history. In an embodiment, the customer information is stored within a customer database, which may comprise a listing of all of the customers of the service provider, as well as a set of attributes for each of these customers.

When a customer provides customer information to the customer service system, he/she may be permitted to provide the customer service system with a preference(s), which may be used to identify a service representative that may assist the customer should he/she require assistance. These preferences may be stored within the customer database as well. In an embodiment, if the customer has not provided the customer service system with a preference(s), the customer service system can utilize a heuristic(s) to calculate these preferences based on the customer information provided by the customer or obtained through alternative methods.

In an embodiment, when a customer submits a request for assistance, the customer service system can access the customer database to determine a customer preference(s) which may be used to select an appropriate service representative to assist the customer. For instance, the customer service system may maintain a service representative database that may comprise a listing of all service representatives employed by the service provider to provide assistance to the customers of the service provider. The service representative database may further include, for each service representative listed, a set of attributes which may be used in conjunction with the customer preferences to select a service representative for the customer. If more than one service representative is selected (e.g., two or more service representatives satisfy the customer preferences), the customer service system may perform additional calculations based on both the customer attributes included in the customer database and the attributes of the selected service representatives included in the service representative database to select a service representative that may assist the customer. The customer service system may transmit the customer request to the service representative environment application, which may subsequently connect the service representative to the customer.

In an embodiment, the customer service system can be configured to dynamically select a service representative to assist a user upon receiving a request for assistance. For instance, the device provided to the customer by the service provider, may be configured to utilize a device(s) installed on or otherwise associated with (e.g., as a peripheral of) the device (e.g., camera, microphone, etc.) to determine a set of attributes of the user. Based on these user attributes, the customer service system may access the customer database and determine whether these user attributes match those of the customer. If the user attributes differ from those of the customer, the customer service system may utilize these user attributes to create service representative criteria for selecting an appropriate service representative. The customer service system may access the service representative database and utilize these service representative criteria to select a service representative that may respond to the user's request for assistance.

In this manner, a service provider may enable a customer or other user of the customer service system to interact with a service representative that is in a secure, acceptable environment and that may be compatible with the customer or other user. In addition, the techniques described and suggested herein facilitate additional technical advantages. For example, because the service representative environment application is persistently operating within the service representative's assigned computing device while interacting with customers of the service provider, the service representative environment application may, at particular intervals or in response to a triggering event(s), continue to utilize the devices installed on the computing device to obtain measurements of the surrounding environment and provide these measurements to the customer service system. This, in turn, may enable the customer service system to take mitigating actions should the computing device encounter an unfavorable surrounding environment that is not conducive to customer interaction. In another example, because the customer service system may be able to dynamically select a service representative based on one or more user attributes, the user may be able to interact with a service representative that is not only familiar with the user's issue, but may also have other things in common with the user. This, in turn, may make the user feel more comfortable with the service representative and lead to a better user experience.

FIG. 1 shows an illustrative example of an environment 100 in which various embodiments can be implemented. In the environment 100, a customer service system 102 may be configured, by a service provider, to provide assistance to one or more customers of the service provider. The customer service system 102 may include a service configured, by the service provider, to enable customers of the service provider to access digital content (e.g., music, eBooks, documents, etc.) over a network, such as the Internet. Other services are also considered as being within the scope of the present disclosure, such as services involved in providing an electronic commerce website or other application where a customer may need help managing their account, placing an order or otherwise interacting with the provided services. The customer service system 102 may be configured to include an option, usable by the customers of the service provider, to request customer assistance should an issue arise through the use of the service provided by the service provider. For instance, if a customer of the service provider is experiencing difficulty in downloading a particular document from the service, the customer may access the customer service system 102 and utilize an interface provided by the customer service system 102 to request assistance. The customer service system 102 may identify a service representative that may be able to assist the customer through the particular issue.

As illustrated in FIG. 1, the environment 100 includes a service representative 104. The service representative 104 may be an individual employed by the service provider to utilize a computing device 106, which may be provided by the service provider, to remotely assist customers of the service provider should it be required. In order to remotely assist customers of the service provider, the service representative 104 may be required to utilize the computing device 106 to initialize a service representative environment application installed on the computing device 106. The service representative environment application may be configured to interact with one or more peripheral devices 108 to scan the surrounding environment in which the computing device 106 is located. For instance, the service representative environment application may initialize a camera installed on the computing device 106 to obtain visual measurements of the surrounding environment. Further, the camera may be used to obtain an image of the service representative 104, which may be used to perform one or more facial recognition analyses. Other peripheral devices 108 may include microphones, light sensors, motion sensors, global positioning system antennae, olfactory sensors and other sensors.

Once the service representative environment application installed on the computing device 106 has utilized the one or more peripheral devices 108 to scan the surrounding environment and obtain environment measurements, the service representative environment application may transmit (i.e., cause the computing device executing the application to transmit) these measurements to an environment analysis component 110 of the customer service system 102. The environment analysis component 110 may comprise one or more hardware resources (e.g., hardware servers, data storage devices, network devices, processors and other equipment) configured to perform one or more analyses based at least in part on the received environment measurements to determine whether the surrounding environment where the service representative 104 is utilizing the computing device 106 is acceptable for providing customer assistance. For instance, the environment analysis component 110 may include a database comprising a listing of acceptable values or ranges of values for one or more environment metrics. These environment metrics may include decibel levels, light intensity, number of individuals within the surrounding environment, facial features (e.g., hair color, eye color, facial geometry, etc.) and the like. Further, the database may comprise a listing of known acceptable values for the surrounding environment for the particular service representative 104. These acceptable values may have been obtained through a previous analysis of the surrounding environment for the service representative 104 that was verified as being within a set of baseline acceptable values, defined by the service provider, for the one or more environment metrics. While the environment analysis component 110 is described and illustrated as a component of the customer service system 102, in some embodiments, some or all analysis described herein is performed by the computing device 106 in accordance with executable instructions for performing some or all of the analysis. Remote attestation to executable code of the computing device 106 and/or other techniques may be used to ensure that the analysis performed by the computing device 106 is performed correctly (e.g., by ensuring that the executable code is unmodified and/or that other code of the computing device 106 is in an approved state).

The environment analysis component 110 may determine, through one or more analyses of the environment measurements received from the service representative environment application installed on the computing device 106, that the surrounding environment is not conducive to providing assistance to customers of the service provider. The environment analysis component 110 may transmit one or more commands to a policy enforcement component 112, such as through one or more API calls to the policy enforcement component 112, to perform one or more mitigating actions. For instance, if the environment analysis component 110 determines, based at least in part on the received environment measurements, that there are more than one individual in the surrounding environment and that none of these individuals appear to be the service representative 104, the environment analysis component 110 may transmit this information to the policy enforcement component 112. The policy enforcement component 112 may determine that a proper mitigating action to be performed is a termination of the service representative environment application and notice to the service representative 104 that the surrounding environment has failed the environment analyses, that unauthorized individuals are present and that at least one unauthorized individual has attempted to interact with customers of the service provider.

In an embodiment, the environment analysis component 110 is configured to utilize one or more functions (classifiers) to determine whether the environment measurements satisfy minimum requirements established by the service provider and one or more baseline environment metrics for the particular service representative 104 who was issued the computing device 106. The environment analysis component 110 may organize the received environment measurements into one or more vectors, which may be analyzed, through the one or more functions to determine whether the environment where the computing device 106 is located is compliant with the criteria (e.g., minimum requirements) established by the service provider and the one or more baseline environment metrics for the particular service representative 104. The results of these analyses, utilizing the one or more functions, may then be provided to the policy enforcement component 112.

The environment analysis component 110 may be initialized and/or updated using machine learning techniques, such as supervised learning techniques. A machine learning algorithm may, at any time, utilize one or more sample vectors to perform one or more simulations to determine whether the functions utilized by the environment analysis component 110 are producing correct and accurate results and/or to refine the one or more functions utilized by the environment analysis component 110 to produce correct and accurate results. For instance, during initialization of the machine learning algorithm, the service provider may provide the machine learning algorithm with one or more sample vectors and analytical results (e.g., desired outcomes) that should be obtained based at least in part on these one or more sample vectors. The machine learning algorithm, based at least in part on this exercise, may adjust the functions utilized by the environment analysis component 110 to analyze the surrounding environment where the computing device 106 is located.

The machine learning algorithm may receive input from one or more analysts employed by the service provider to analyze the results from the one or more analyses performed by the environment analysis component 110 through use of the one or more functions described above. For instance, an analyst may review images, video, audio, and/or numerical measurements of the environment of a service representative 104 to determine whether the surrounding environment of the service representative 104 is compliant with the service provider's criteria. The analyst may provide his/her input for use in refining a function used to classify vector input as corresponding to compliant or non-compliant environments. The vector of measurements corresponding to the review performed by the analyst and the desired outcome corresponding to the analyst's input may be used by the machine learning algorithm to update the function used to classify vector inputs. Such may be performed by multiple analysts and/or using multiple vector inputs to provide the machine learning algorithm a sufficient number of sample vector inputs and desired outputs. The machine learning algorithm may adjust the one or more functions used by the environment analysis component 110 to increase the likelihood that the desired result is obtained in future analyses.

The function used to classify measurement vectors may vary in accordance with various embodiments. For example, in some embodiments, support vector machine techniques are used to classify regions in Euclidean space as compliant or non-compliant so that measurements are classified in accordance with the region in which the measurement vectors fall. In yet another embodiment, the machine learning algorithm can utilize decision tree learning to determine a decision (classification, regression) tree used to classify vector input as compliant or non-compliant. As a fictitious illustrative example, if a minimum requirement established by the service provider is that male service representatives cannot have a certain hair length but female service representatives can, the machine learning may result in a decision tree that, at least in part, bifurcates based on vector components indicating the gender of a customer service representative and his/her hair length. If the input includes a male with hair that exceeds a predetermined length, the one or more functions (decision trees) would, in this example, be configured to provide a result that the environment is not compliant. Thus, the machine learning algorithm may adjust the one or more functions if these one or more functions do not result in an issue if a male has a hair length that exceeds the predetermined length.

The policy enforcement component 112 may transmit one or more executable instructions to the service representative environment application through the computing device 106 that, when executed by the application, may cause the application to perform the one or more mitigating actions requested by the policy enforcement component 112. Using the example above, if the policy enforcement component 112 has determined that the proper mitigating action to be performed is a termination of the service representative environment application and notice to the service representative 104 that the surrounding environment has failed the environment analyses, the application may generate a notice that is displayed on the computing device 106 to inform the service representative 104 of the issues concerning the surrounding environment and, subsequently, the application may terminate itself. If the service representative 104 initiates the service representative environment application at a later time, the service representative environment application may obtain a new set of environment measurements and transmit these measurements to the environment analysis component 110 to perform new analyses based at least in part on these measurements.

If the environment analysis component 110 determines that the surrounding environment where the computing device 106 is located is acceptable (e.g., satisfy the specified acceptable environment metrics included in the database), then the environment analysis component 110 may transmit this information to the policy enforcement component 112. The policy enforcement component 112 may transmit one or more executable instructions to the service representative environment application that, when executed by the application, causes the application to enable the service representative 104 to interact with any customer of the service provider requiring assistance. Further, the service representative environment application may continue to utilize the one or more peripheral devices 108 to obtain further environment measurements, which may be used to continue evaluating the surrounding environment and, should the surrounding environment become unacceptable, take mitigating action to prevent further interaction with customers of the service provider.

Figure 2:
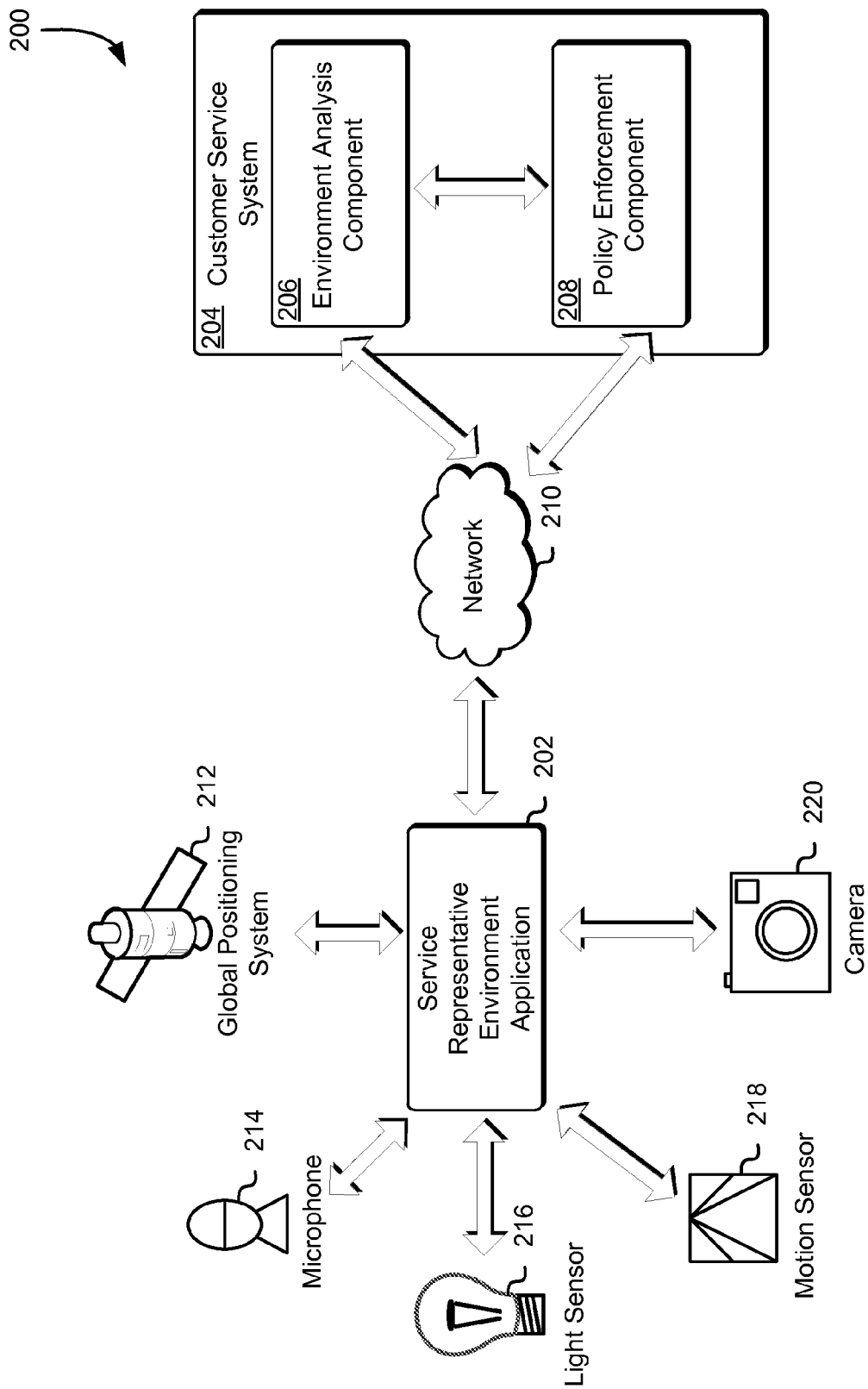
FIG. 2 shows an illustrative example of an environment in which various embodiments can be implemented.

As noted above, the computing device provided to a service representative may include a service representative environment application configured to obtain measurements for the surrounding environment where the computing device is located and provide these measurements to an environment analysis component to determine whether the surrounding environment is acceptable for customer interactions. FIG. 2 shows an illustrative example of an environment 200 in which a service representative environment application 202 installed on a computing device issued to a service representative is configured to interact with one or more peripheral devices to obtain and provide environment measurements to a customer service system 204. As noted above, the computing device issued to a service representative by the service provider may include one or more peripheral devices (e.g., sensors), which may be used to scan the surrounding environment and obtain one or more environment measurements. The service representative environment application 202, installed on the computing device, may be configured to initiate these one or more peripheral devices and obtain these environment measurements. The service representative environment application 202 may begin to utilize the one or more peripheral devices to scan the environment upon being initialized by the service representative or after a certain time interval or triggering event.

As illustrated in FIG. 2, the service representative environment application 202 may interact with one or more peripheral devices installed on the computing device provided to the service representative to scan the surrounding environment. For instance, in this particular illustrative example, the service representative environment application 202 may interact with at least five types of peripheral devices. The peripheral devices that may be installed on the computing device, in this example, include a GPS antenna 212, a microphone 214, a light sensor 216, a motion sensor 218 and a camera 220, although not all embodiments of the present disclosure will include all such peripheral devices and additional peripheral devices may be installed on the computing device in addition to or as an alternative to the peripheral devices explicitly described herein.

The GPS antenna 212 may be installed on the computing device to identify the location of the computing device on Earth's surface. The GPS antenna 212, along with an integrated GPS receiver installed on the computing device, may be used to communicate with four or more satellites orbiting Earth to determine a distance between the GPS receiver and each of the four or more satellites. Further, the GPS receiver may receive the location of these four or more satellites orbiting the Earth's surface from each of these satellites in the form of radio signals. With this information, the GPS receiver may utilize three-dimensional trilateration to calculate the location of the GPS receiver on the Earth's surface. Thus, the GPS antenna 212 and GPS receiver may be utilized to determine whether the computing device is being utilized in a private residence, public location or other location. Location may also be determined in other ways in accordance with various embodiments. For example, a location determination module may also be stored in memory (e.g., module of executable code) and be configured to determine the location of the computing device 106 of FIG. 1 (i.e., to cause a device executing the code to determine the location). The location determination module may be configured to determine location using network positioning services or facilities. For example, the customer service system 204 may query a cellular data carrier to provide positioning information for the computing device 106 based at least in part on time-difference-of-arrival data to several cellular radio sites. The location determination module may also receive information from data networks or third-party providers which associate a particular network address to a particular location. For example, the internet protocol address of 206.33.56.105, a media access control address 04:00:12:03:11:A1 of a wireless access point, or both may be associated with the street address of 935 Pennsylvania Avenue Northwest in Washington, D.C.

The microphone 214 may be installed on the computing device to detect and record audio input from the surrounding environment. The microphone 214 may be configured to convert acoustic waves into electrical signals, which a processor may utilize to measure the intensity of the acoustic waves. Further, the processor may record the electrical signals from the microphone 214 into a digital file, which may be used by an audio software application to analyze the recorded audio input and, based on the analysis, determine certain characteristics of the audio input. For instance, an audio software application may be able to discern whether one or more individuals are present and speaking to one another in the surrounding environment. Further, the audio software application may be able to discern whether other audio producing devices are operating within the surrounding environment. The microphone 214 may be utilized to determine whether the computing device is being utilized in a public location, a noisy location, or a location where more than one individual are present.

The light sensor 216 may be installed on the computing device to detect the intensity of light in the surrounding environment. For instance, the light sensor 216 may be configured to convert the light energy from the surrounding environment into an electrical signal. A processor may utilize this electrical signal to determine one or more characteristics of the surrounding environment. For instance, the electrical signal may be utilized to determine what kind of light sources are present in the surrounding environment. The light sensor 216 may be utilized to determine whether the computing device is being utilized in a location with commercial, domestic or natural light sources.

The motion sensor 218 may be installed on the computing device to detect the motion of an individual or other object within the surrounding environment. The motion sensor 218 may be configured to operate in various ways. For instance, the computing device may include a radar-based motion sensor, which may be configured to transmit a radio signal throughout the surrounding environment. The motion sensor 218 may receive a reflected signal from the environment. If, at any point, the reflected signal from the environment changes, the motion sensor 218 may detect the presence of a change in the environment. The service representative environment application may utilize the motion sensor 218 to detect such a change and initiate the other peripheral devices to obtain new environment measurements.

The camera 220 may be installed on the computing device for a variety of purposes. For instance, the camera 220 may be used to capture a pictographic (e.g., visual) representation of the surrounding environment, which may be used to determine, among other things, the characteristics of the surrounding environment, the physical characteristics of the service representative (e.g., facial features, hair color, eye color, etc.) and the presence of additional individuals in the surrounding environment. This pictographic representation of the surrounding environment may also be used to obtain additional, redundant data points as those produced by other peripheral devices. For example, the pictographic representation of the surrounding environment may be used to determine the light intensity of the surrounding environment. In another example, the camera 220 may be used in place of the motion sensor 218, such that the camera 220 may operate persistently and capture a pictographic representation of the surrounding environment should the camera 220 detect a change in the surrounding environment.

In an embodiment, the computing device provided to a service representative can include a trusted platform module (TPM), which may be used to ensure that software applications and/or associated resource files, an operating system, and/or firmware of the computing device have not been tampered, modified, removed or added without proper authorization. For instance, the TPM may include an attestation identity key (AIK), which may be used to digitally sign a hash of firmware, software and/or associated resource files installed on the computing device prior to execution of the firmware and the software. This digitally signed hash may be transmitted, by the service representative environment application 202 to the environment analysis component 206 of the customer service system 204 to determine whether the software and/or firmware configuration of the computing device has been tampered with. For instance, the environment analysis component 206 may utilize a public cryptographic key to verify the digital signature of the hash and, subsequently, utilize the hash to determine whether it matches a known hash value for the particular computing device. If the hash values do not match, then the computing device may have been altered in an unauthorized manner and, thus, may not be secure for customer interactions.

Once the service representative environment application 202 receives the various environment measurements (e.g., GPS coordinates, pictographic representations of the surrounding environment, light intensity readings, etc.), the service representative environment application 202 may transmit, through a network 210, such as the Internet, these environment measurements to an environment analysis component 206 of the customer service system 204. The environment analysis component 206 may comprise one or more hardware devices, such as one or more data storage devices and processors, collectively configured to utilize the received environment measurements to determine whether the surrounding environment where the computing device is located is conducive to customer interaction. For instance, the environment analysis component 206 may include a database comprising a listing of one or more baseline environment metrics that may be used to establish a range of acceptable values for the surrounding environment in order to be deemed conducive to customer interaction. An example of baseline environment metric is that no more than one individual may be present in the surrounding environment at a given time. Thus, if the environment analysis component 206 analyzes the environment measurements obtained from the service representative environment application 202 and determines that more than one individual is present in the surrounding environment, the environment analysis component 206 may specify that this metric has not been met and transmit one or more commands to a policy enforcement component 208 to prevent the computing device from being used to interact with customers.

In an embodiment, the environment analysis component 206 is configured to further maintain a set of baseline environment metrics for each individual service representative that may be using a computing device in a remote location. The baseline environment metrics for each individual service representative may satisfy the one or more baseline environment metrics established by the customer service system 204 as a minimum requirement for the surrounding environment to be conducive to customer interaction. The environment analysis component 206 may be configured to analyze the received environment measurements to determine whether these measurements satisfy the minimum requirements for the surrounding environment and the baseline environment metrics for the individual service representative. For instance, if the received environment measurements deviate from the baseline environment metrics for the individual service representative by a certain amount, the environment analysis component 206 may determine that the surrounding environment has changed sufficiently to present an issue, even though the received environment measurements satisfy the minimum requirements established by the provider of the customer service system 204.

As noted above, the environment analysis component 206 may utilize a machine learning algorithm, which may be configured to obtain the results of all analyses performed by the environment analysis component 206 to refine the one or more classifier functions used to classify vector inputs. As additional sample vectors and desired outcomes are provided, the machine learning algorithm may modify the one or more classifier functions utilized by the environment analysis component 206 such that future analyses are more likely to produce accurate results. Classifier functions may be utilized on a global and/or per-representative basis and/or for other bases (e.g., categories of representatives, such as department or other categorizations). Globally, a classifier function may be used for all representatives. For per-representative or per-category classifier functions, each representative or category of representatives may have their own classifier used instead of or in addition to a global classifier function. For instance, if one or more analyses of the surrounding environment produces a result that the surrounding environment is not compliant because the person utilizing the computing device is classified as not being the service representative because the service representative does not have, for example, magenta-colored highlights in her hair, the machine learning algorithm may adjust the classifier functions utilized by the environment analysis component 206 such that the environment analysis component 206 is not only able to identify the service representative if the service representative's hair color has changed, but also determine whether such a change in hair color should raise other concerns (e.g., one or more requirements that a service representative should only have natural hair colors, etc.). In some embodiments, different classifier functions are used together (i.e., to form a composite classifier function). For instance, for a surrounding environment to be considered compliant, a measurement vector for the environment may have to be classified as compliant by all of multiple classifier functions (e.g., a global or category-specific classifier function together with a representative-specific classifier function).

Once the environment analysis component 206 has completed analyzing the received environment measurements from the service representative environment application 202, the environment analysis component 206 may transmit one or more commands to a policy enforcement component 208, such as through one or more API calls to the component, to cause the policy enforcement component 208 to perform one or more tasks in accordance with the results of the analyses. For instance, if the received environment measurements do not satisfy the minimum requirements set forth by the service provider for the customer service system 204 or deviate sufficiently from the baseline environment metrics for the particular service representative, the policy enforcement component 208 may transmit one or more executable instructions, through the network 210, to the service representative environment application 202 that may cause the service representative environment application 202 to perform one or more mitigating actions (e.g., termination of the application, preventing the service representative from accessing customer information, obtaining additional environment measurements for further analyses, etc.). Alternatively, if the received environment measurements do satisfy the minimum requirements set forth by the service provider and the baseline environment metrics for the particular service representative, the policy enforcement component 208 may transmit one or more executable instructions to the service representative environment application 202 that may cause the service representative environment application 202 to enable the service representative to utilize the application to access customer information and provide customer assistance to customers of the service provider.

In some embodiments, the environment analysis component 206 provides the one or more environment measurements received from the computing device to one or more analysts employed by the service provider. These one or more analysts may utilize these environment measurements to determine whether the surrounding environment where the service representative's computing device is located is compliant with the service provider's minimum requirements. Further, in some embodiments, the one or more analysts may compare the results of its analyses to the results obtained from the environment analysis component 206 to determine whether the environment analysis component 206 is accurately determining whether the surrounding environment is compliant or non-compliant. If the one or more analysts determine that the environment analysis component 206 did not produce the desired outcome based at least in part on one or more analyses of the received environment measurements, the vector of measurements corresponding to the review performed by the one or more analysts and the desired outcome corresponding to the analyst's input may be provided to the machine learning algorithm. The machine learning algorithm may utilize the vector of measurements and the desired outcome to update the function used to classify vector inputs. Such may be performed by multiple analysts and/or using multiple vector inputs to provide the machine learning algorithm a sufficient number of sample vector inputs and desired outputs. The machine learning algorithm may adjust the one or more functions used by the environment analysis component 206 to increase the likelihood that the desired result is obtained in future analyses.

Figure 3:
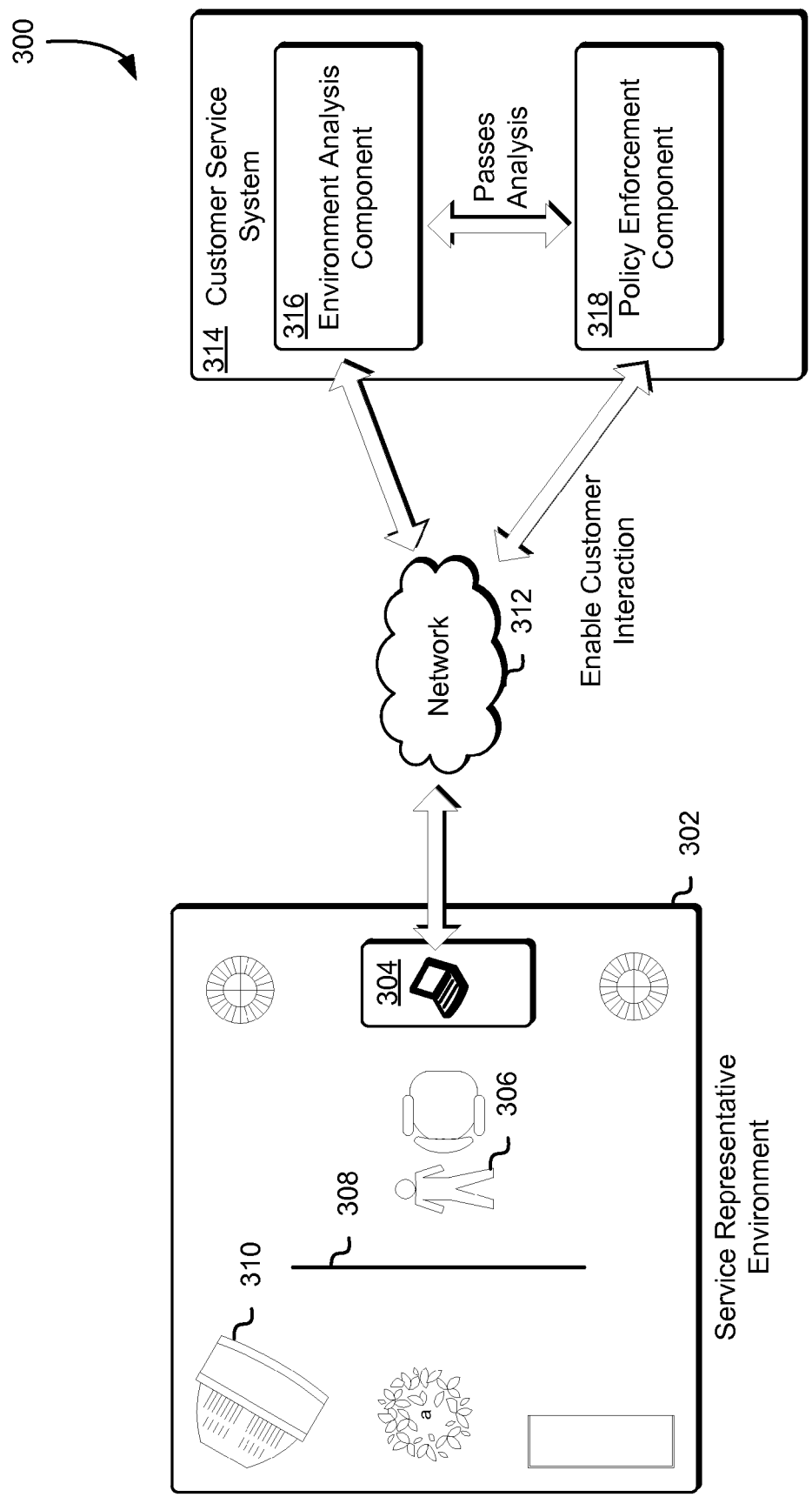
FIG. 3 shows an illustrative example of an environment in which a service representative environment is analyzed and determined to be acceptable for customer interaction in accordance with at least one embodiment.

As noted above, the computing device issued to a service representative for providing customer assistance to customers of a service provider may include a variety of peripheral devices which may be used by a service representative environment application, installed on the computing device, to obtain environment measurements of the surrounding environment. FIG. 3 shows an illustrative example of an environment 300 in which a service representative environment 302 is analyzed and determined to be acceptable for customer interaction in accordance with at least one embodiment. In an ideal service representative environment 302, the computing device 304 may be placed in a location where the entire service representative environment 302 may be scanned to obtain a set of environment measurements. For instance, in this illustrative example, the computing device 304, through the one or more peripheral devices and the service representative environment application installed on the computing device 304, may obtain a pictographic representation of the service representative environment 302, as well as other environment measurements (e.g., sound levels, light intensity, etc.). For example, a pictographic representation of the service representative environment 302 may illustrate that the service representative 306 is located directly in front of the computing device 304, the service representative 306 has installed an adaptive background screen 308 (e.g., temporary wall) to create a more presentable workspace and display one or more images and a television set 310, located in the rear of the service representative environment 302, has not been turned on. Further, an audio recording of the service representative environment 302 may also indicate that the television set 310 has not been turned on and is thus not producing any unwanted noise.

Figure 14:
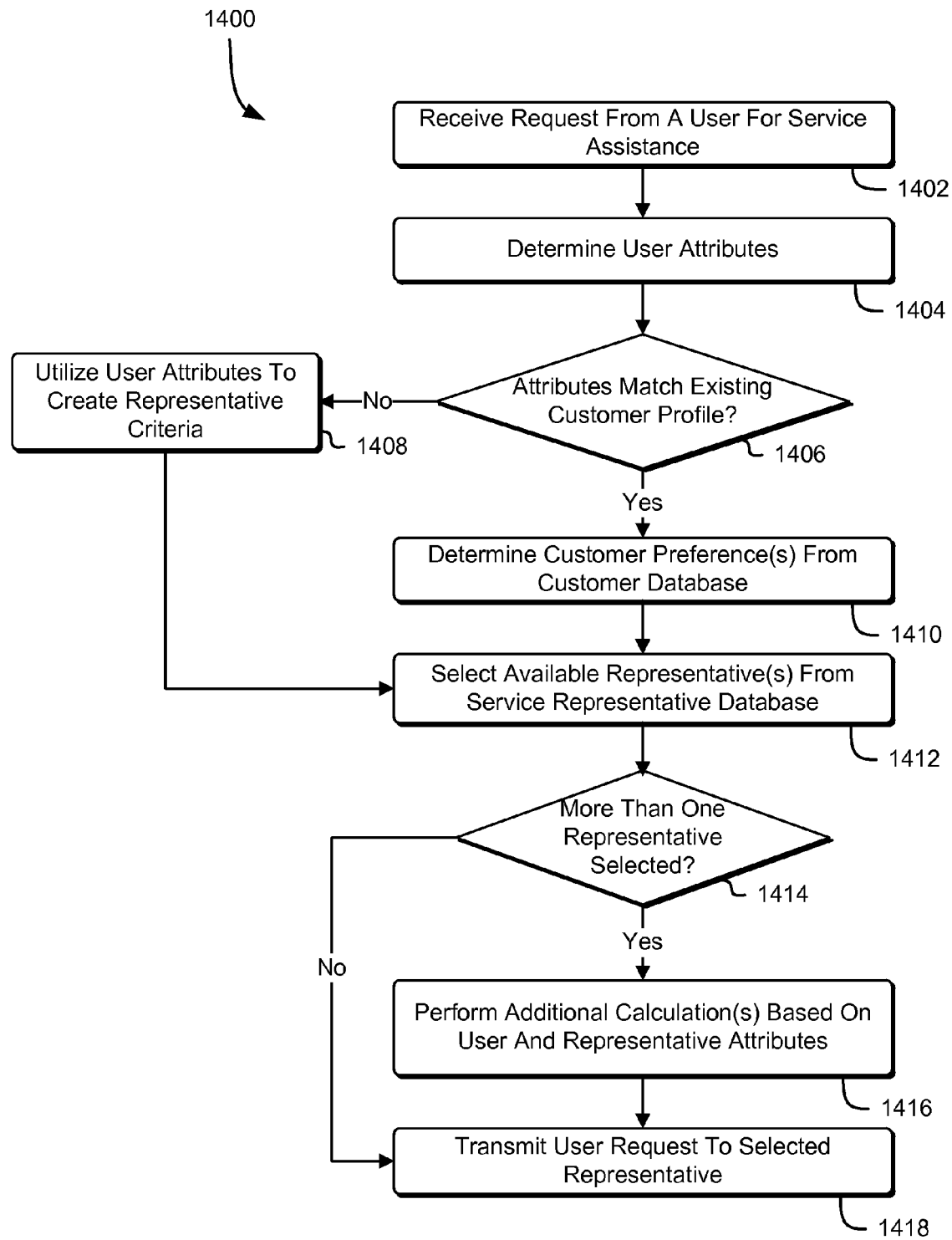
FIG. 14 shows an illustrative example of a process for dynamically selecting a service representative based at least in part on one or more customer attributes obtained when a customer submits a request for assistance in accordance with at least one embodiment.

In an embodiment, and as will be described in greater detail below in connection with FIG. 14, the adaptive background screen 308 is configured to display one or more images based at least in part on one or more personal characteristics of a user that has submitted a request for assistance. The screen may be a projection screen, a "green screen" enabling use of chroma keying techniques by the computing device 304 and/or the customer service system 314. With chroma keying techniques, two or more images and/or video streams may be layered together based on color hues. For example a video of the customer service representative 306 may be layered over a background image that has been selected based at least in part on attributes and/or preferences associated with the customer. Physical characteristics of the customer service representative 306 may be selected for compatibility with chroma keying techniques employed so that, for example, green hair will not cause the customer service representative 306 to appear to the customer to have invisible hair when the chroma keying techniques are applied. When the customer service system utilizes user attributes to select an available service representative 306 from a service representative database, the customer service may transmit a request for assistance to the computing device 304 of the selected service representative 306. This, in turn, may cause the computing device 304 to transmit one or more executable instructions to the adaptive background screen 308, such as through one or more wireless communications methods (e.g., WiFi, Bluetooth®, etc.), to cause the adaptive background screen 308 to display the one or more images.

Once these environment measurements have been obtained by the service representative environment application installed on the computing device 304, the application may transmit these measurements, over a network 312 such as the Internet, to an environment analysis component 316 of the customer service system 314. As noted above, the environment analysis component 316 may be configured to obtain these environment measurements and perform one or more analyses to determine whether these environment measurements satisfy one or more threshold requirements (e.g., maximum allowable sound levels, maximum amount of individuals present in the service representative environment 302, etc.). Further, the environment analysis component 316 may be configured such that these one or more analyses may be performed to determine whether these environment measurements are within the baseline environment metrics for the individual service representative 306. In this illustrative example, the obtained environment measurements satisfy both the minimum requirements established by the service provider and the baseline environment metrics for the individual service representative 306. The environment analysis component 316 may transmit one or more commands to a policy enforcement component 318, such as through one or more API calls to the component, to cause the policy enforcement component 318 to perform one or more actions. For instance, since the present service representative environment 302 satisfies the one or more minimum requirements set forth by the service provider and are within a particular range for the baseline environment metrics for the individual service representative 306, the environment analysis component 316 may cause the policy enforcement component 318 to enable the service representative 306 to utilize the computing device 304 to interact with customers of the service provider and access customer information.

The policy enforcement component 318 may transmit, over the network 312, one or more executable instructions to the service representative environment application installed on the computing device 304 that, when executed by the application, may cause the application to enable the service representative 306 to utilize the computing device 304 to interact with customers requiring assistance and to access customer information, as needed. Further, the one or more executable instructions may cause the service representative environment application installed on the computing device 304 to continue to utilize the peripheral devices installed on the computing device 304 to monitor the service representative environment 302 to obtain new environment measurements for analysis after a certain period of time or as a result of a change in the service representative environment 302 (e.g., additional individuals are detected, sounds levels increase, light intensity changes, etc.).

Figure 4:
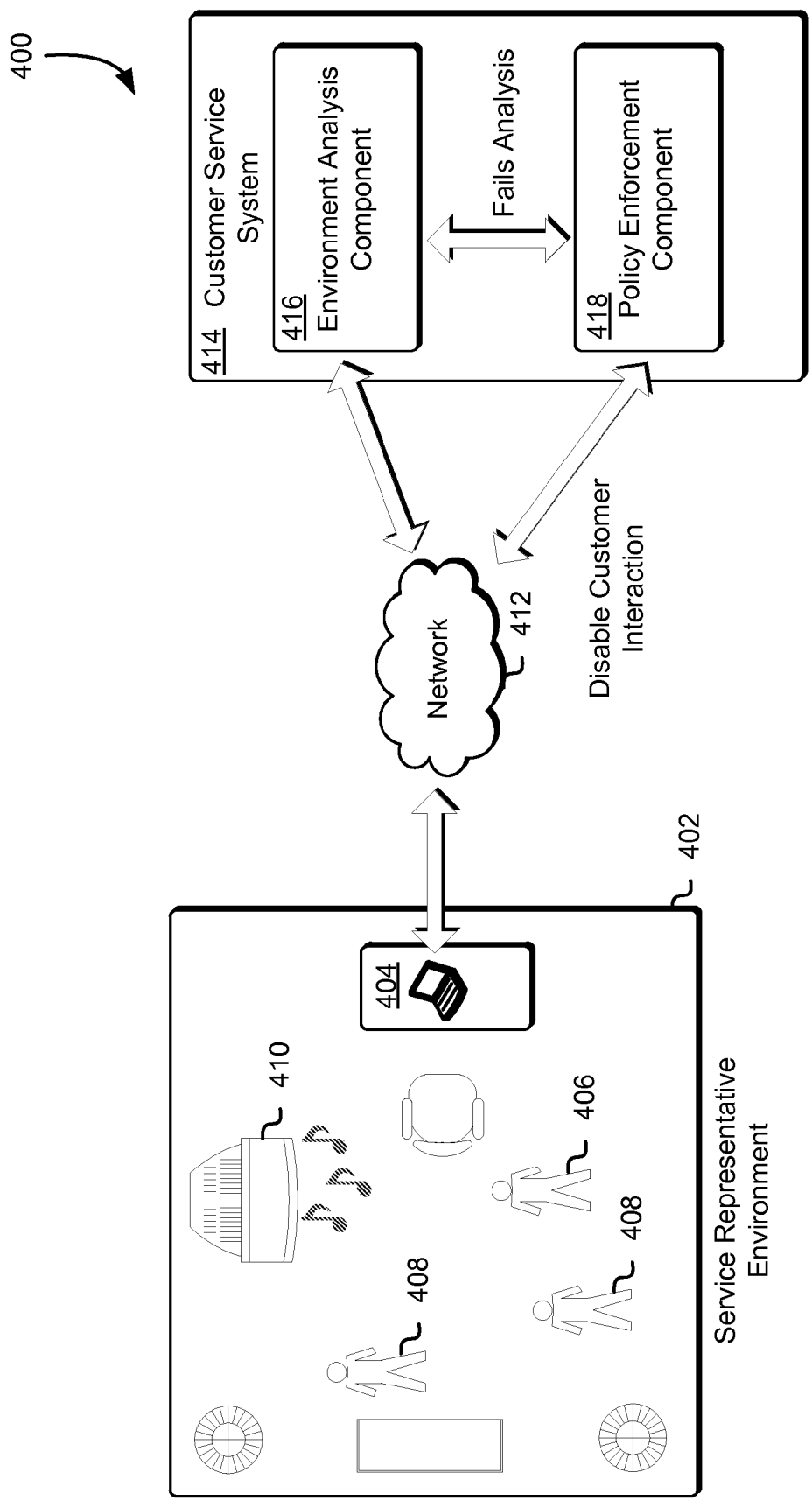
FIG. 4 shows an illustrative example of an environment in which a service representative environment is analyzed and determined to be unacceptable for customer interaction in accordance with at least one embodiment.

If, alternatively, the service representative environment is not conducive to customer interaction, it may be desirable to prevent the service representative from interacting with customers of the service provider until remedial actions are taken to bring the environment into compliance with certain minimum requirements. FIG. 4 shows an illustrative example of an environment 400 in which a service representative environment 402 is analyzed and determined to be unacceptable for customer interaction in accordance with at least one embodiment. In this illustrative example, the computing device 404, through the one or more peripheral devices and the service representative environment application installed on the computing device 404, may obtain a pictographic representation of the service representative environment 402, as well as other environment measurements (e.g., sound levels, light intensity, etc.). However, unlike the ideal service representative environment illustrated in FIG. 3, the pictographic representation of the service representative environment 402 may illustrate that the service representative 406 is not positioned in front of the computing device 404, that there are additional individuals 408 present and that the television set 410 has been turned on. Further, an audio recording of the service representative environment 402 may include conversations between the service representative 406 and the additional individuals 408 present, as well as noise that may be emitted by the television set 410.

These environment measurements may be transmitted by the service representative environment application, through a network 412, to the environment analysis component 416 of the customer service system 414. The environment analysis component 416 may analyze these environment measurements to determine whether these environment measurements satisfy the minimum requirements for an environment as defined by the service provider, as well as a set of baseline environment metrics for the individual service representative 406. For instance, a minimum requirement for the environment is that no one other than the service representative 406 may be present within the service representative environment 402 while the computing device 404 is in use. The environment measurements for the service representative environment 402 may fail to meet these minimum requirements, as additional individuals 408 were detected in the service representative environment 402. Further, as a result of the additional individuals 408 being present in the service representative environment 402, as well as the television set 410 emitting additional noise into the service representative environment 402, the environment measurements may fail to satisfy additional minimum requirements for appropriate sound levels.

Additionally, these environment measurements may fail to satisfy one or more baseline environment metrics for the individual service representative 406. For instance, if the baseline environment metrics for the individual service representative 406 were established based at least in part on environment measurements obtained for an environment similar to that illustrated in FIG. 3, the environment measurements obtained for the service representative environment 402 may sufficiently vary from these baseline environment metrics to result in detection of a potential issue with the present environment.

If the environment analysis component 416 determines, based at least in part on analyses of the received environment measurements, the minimum requirements set forth by service provider and the baseline environment metrics for the individual service representative 406, that the service representative environment 402 is not suitable for customer interaction, the environment analysis component 416 may transmit one or more commands to a policy enforcement component 418 to prevent the service representative 406 from interacting with customers of the service provider. The policy enforcement component 418 may determine, based on the results of the analyses, what mitigating actions should be taken. For instance, the policy enforcement component 418 may transmit, through the network 412, one or more executable instructions to the service representative environment application installed on the computing device 404 that, when executed by the application, may cause the application to display, on the computing device 404, an informative notice as to the current issues with the service representative environment 402 and the mitigating actions being taken to prevent interaction with customers of the service provider. Further, the executable instructions may further cause the application installed on the computing device 404 to disable access to customer information and any further interactions with customers of the service provider, as well as cause the application to terminate.

Figure 5:
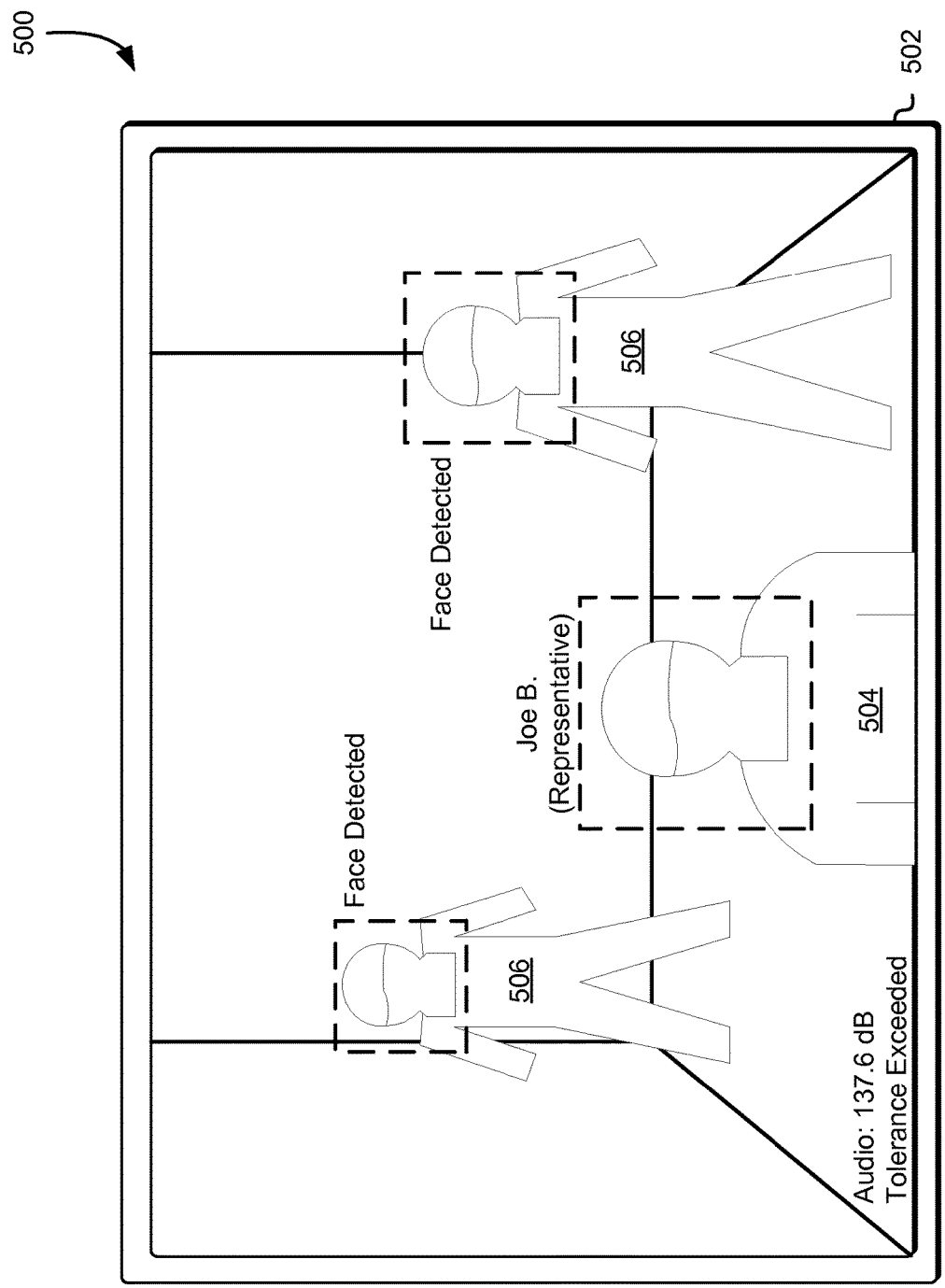
FIG. 5 shows an illustrative example of an environment in which one or more analyses are performed on a service representative environment in accordance with at least one embodiment.

As noted above, a service representative environment application may be installed on a computing device and configured to utilize one or more peripheral devices installed on the computing device to obtain environment measurements for the service representative environment. These measurements may be transmitted to an environment analysis component of a customer service system for analysis to determine whether the service representative environment is suitable for customer interaction. FIG. 5 shows an illustrative example of an environment 500 in which one or more analyses are performed on a service representative environment in accordance with at least one embodiment. In the environment 500, the environment analysis component of the customer service system may have received one or more environment measurements from a service representative environment application installed on a computing device issued to a service representative. For instance, these environment measurements may include a pictographic representation 502 of the surrounding environment, one or more audio recordings and other measurements.

As noted above, the environment analysis component of the customer service system may comprise one or more hardware resources (e.g., hardware servers, data storage devices, network devices, processors and other equipment) configured to perform one or more analyses based at least in part on the received environment measurements to determine whether the surrounding environment is suitable for interaction with one or more customers of the service provider. For instance, as illustrated in FIG. 5, the environment analysis component may utilize a pictographic representation 502 of the surrounding environment to detect and identify each individual within the surrounding environment. For example, in the pictographic representation 502, the environment analysis component has detected that at least three individuals are present. Further, the environment analysis component may utilize one or more algorithms, as well as a database comprising known physical characteristics of each of the service representatives employed by the service provider, to identify the service representative 504 and determine, based on their physical characteristics, that the other individuals 506 are not service representatives.

In addition to an analysis of the pictographic representation 502 of the surrounding environment, the environment analysis component may evaluate the one or more audio recordings of the surrounding environment to determine whether the sound levels within the surrounding environment are conducive to interactions with one or more customers of the service provider. For instance, as illustrated in FIG. 5, the environment analysis component has determined, based at least in part on these audio recordings, that the sound level within the surrounding environment is approximately 137.6 decibels. The environment analysis component may compare this sound level to a maximum allowable sound level requirement established by the service provider. Further, the sound level of the surrounding environment may also be compared to a known baseline environment metric for this particular service representative 504 to determine whether there has been a significant variance between past measurements and this current measurement.

If the sound level of the surrounding environment exceeds the maximum allowable sound level, as illustrated in FIG. 5, or is substantially different than the known baseline environment metric for this particular service representative 504, the environment analysis component may transmit one or more commands to a policy enforcement component in order to prevent the service representative 504, or any other user, from utilizing the computing device to interact with customers of the service provider or access customer information. The policy enforcement component of the customer service system may transmit one or more executable instructions to an application installed on the computing device that, when executed by the application, may cause the application to perform one or more mitigating actions (e.g., disable communications with any other customers, disable access to a customer database, display a pictographic representation of the analyses performed and the resulting issues, etc.). Thus, the service representative 504 may be prevented from communicating with one or more customers of the service provider and may also be presented with sufficient information to take appropriate remedial actions to correct any existing issues and resume interaction with the one or more customers of the service provider as required.

As noted above, if the surrounding environment where the service representative is utilizing the computing device issued to him/her by the service provider has been determined to be acceptable for interacting with one or more customers, the service representative may utilize the computing device to provide customer assistance and access customer information.

Figure 6:
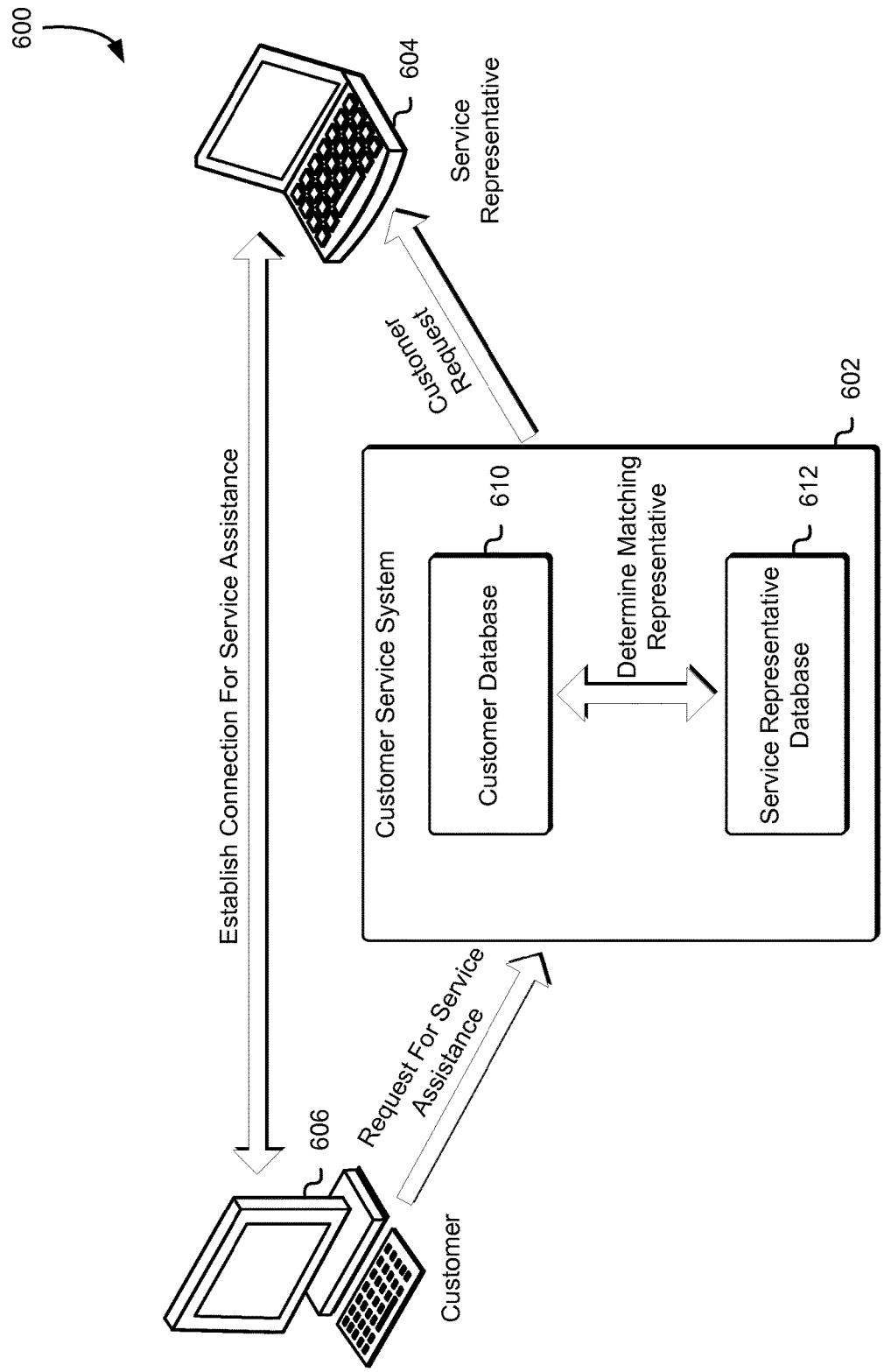
FIG. 6 shows an illustrative example of an environment in which various embodiments can be implemented.

FIG. 6 shows an illustrative example of an environment 600 in which a customer service system 602 may select an appropriate service representative to provide customer assistance to a customer in accordance with at least one embodiment. In the environment 600, a customer computing device 606 may submit a request, to the customer service system 602, to obtain assistance related to one or more features of a service provided by the service provider. For instance, the customer computing device 606 may require assistance with accessing one or more music files purchased from the service provided by the service provider. The customer service system 602, in response to the request from the customer computing device 606 for assistance, may access a customer database 610 to obtain one or more characteristics of the customer computing device 606, as well as one or more preferences, which may be used to identify an appropriate service representative that may be able to assist the customer computing device 606.

As will be described in greater detail below in connection with FIG. 7, the customer database 610 may comprise a listing of one or more customers of the service provider, as well as a listing of characteristics and preferences for each of these one or more customers. For instance, when a customer computing device 606 initially establishes a relationship with the customer service system 602 (e.g., creates a new account, utilizes a device provided to the customer computing device 606 by a service provider for accessing the customer service system 602, etc.), the customer may be required to provide information regarding him or herself. For example, the customer computing device 606 may provide the customer's name, home mailing address, billing address, age range, gender, known languages and the like. Further, the customer may be given the opportunity to define one or more preferences, which may be used by the customer service system 602 to identify a service representative that may assist the customer should the need arise. In an embodiment, if the customer has not specified one or more preferences which may be used to select a service representative, the customer service system 602 can access the customer database 610 and, based at least in part on the information included within the customer database 610 associated with the customer, utilize one or more algorithms to generate one or more preferences, which may then be stored within the customer database 610.

When the customer service system 602 receives a request, from the customer computing device 606, for assistance from a service representative, the customer service system 602 may utilize the customer database 610 to obtain the customer's characteristics and preferences. The customer service system 602 may access a service representative database 612, which may comprise a listing of one or more service representatives employed by the service provider to provide assistance to the customers of the service provider. As will be described in greater detail in connection with FIG. 8, the service representative database 612 may additionally include a listing of one or more characteristics for each of the one or more service representatives employed by the service provider. These characteristics may be similar to those included in the customer database 610. The customer service system 602 may utilize the customer's preferences to identify one or more service representatives from the service representative database 612 that may satisfy these preferences. For instance, if a customer has specified (e.g., through the customer computing device or another computing device) that he or she prefers to be assisted by a service representative that is fluent in Spanish, the customer service system 602 may identify, from the service representative database 612, one or more service representatives that are fluent in Spanish.

If the customer service system 602 identifies more than one service representative that satisfies the customer's preferences, the customer service system 602 may utilize one or more algorithms to select a service representative based at least in part on the similarities between the customer's characteristics and the characteristics of each of the service representatives initially selected based at least in part on the customer's preferences. For instance, the customer service system 602 may be configured to utilize these one or more algorithms to rank the selected service representatives based at least in part on these similarities. The highest ranked service representative may be selected to assist the customer 606.

In an embodiment, the customer service system 602 can transmit one or more executable instructions to the customer's computing device 606 to obtain one or more characteristics of the customer, which may be used to determine whether the customer has an entry included in the customer database 610 and, if not, utilize one or more functions to select a service representative from the service representative database 612 that may assist the customer. For instance, the customer service system 602 may transmit one or more executable instructions to the customer's computing device 606 that may cause the computing device to initialize and/or use one or more peripheral devices, including multiple sensors, installed on the computing device to capture and obtain these one or more customer characteristics. The multiple sensors installed on the computing device may include a GPS antenna, a microphone, a light sensor, a motion sensor and a camera, although not all embodiments of the present disclosure will include all such sensors and additional sensors may be installed on the computing device in addition to or as an alternative to the sensors explicitly described herein. Additionally, or alternatively, the customer service system 602 may transmit one or more executable instructions to the customer's computing device 606 that may cause the computing device to retrieve a log comprising a listing of one or more actions performed by the customer in utilizing the computing device. For example, the computing device may be configured to track the customer's interactions with the computing device 606 and maintain a listing of these interactions within a log file. The customer service system 602 may receive these customer characteristics and/or log files from the customer's computing device 606 to determine whether these match a customer entry within the customer database 610 and to determine the nature of the customer's request for assistance. If there is a match, the customer service system 602 may utilize the customer entry within the customer database 610 to select an appropriate service representative from the service representative database 612. Alternatively, if there is no match, the customer service system 602 may utilize one or more classifier functions and select an appropriate service representative from the service representative database 612 based at least in part on the received customer characteristics and/or log files.

In an embodiment, the customer service system 602 can utilize an avatar created by the customer or other user to obtain one or more characteristics of the customer that may be used to select a service representative from the service representative database 612 that may assist the customer. The avatar may be any type of representation of the customer such as a human, animal, mechanical, or other object. For example, in an online card game the avatar may be represented simply as a pair of hands holding cards or simply as the cards themselves. The customer service system 602 may be configured to analyze the customer avatar to obtain one or more customer characteristics and preferences that may be recorded in the customer's entry within the customer database 610. Additionally, the customer service system 602 may be configured to analyze the one or more interactions the customer may have had with his/her avatar. For instance, the customer may utilize an avatar within a virtual environment to hunt for wild game. The computer system service 602 may utilize this information to determine that the customer may enjoy hunting as a hobby. This information may be added to the customer database 610 for use in selecting a service representative. If the avatar corresponds to a user that has not been identified as a customer, the customer service system 602 may utilize one or more characteristics of the avatar to identify one or more preferences for the user and select an appropriate service representative from the service representative database 612. The avatar, as well as interactions with a virtual environment performed using the avatar, may be obtained by the customer service system 602 from another entity (synchronously or asynchronously), such as a gaming system service, a social networking website or any other virtual computer system environment. In some embodiments, requests for assistance may be routed to customer service representatives based at least in part on similar interests. For example, the representative and/or customer attributes may be determined from the customer's purchase history, as well as social network data of customers who have chosen to link their electronic commerce provider accounts with social network accounts. A graph of the interests of customers calling or otherwise requesting assistance from the electronic commerce provider can be made and compared with the volunteered information from the social network and used to match customer service representatives to customers based at least in part on similarities.

In an embodiment, the customer service system 602 utilizes one or more machine learning algorithms to further calibrate the one or more classifier functions utilized to select an appropriate service representative from the service representative database 612. For instance, supervised learning techniques such as described above may be used to determine and/or refine the one or more classifier functions. A machine learning algorithm may, for example, be provided with one or more inputs (e.g., for each of multiple customers (either fictitious or real) a vector based on stored information and/or environmental measurements of a customer or other user of the customer's computing device 606) and corresponding desired outputs (e.g., traits of a human selected customer service representative) to determine/refine functions used by the customer service system 602 to improve the process of selecting a service representative. For example, the machine learning algorithms may be provided, by a service provider, one or more sample inputs that include a sample log file, sample avatar-related data and sample customer characteristics that may, theoretically, be included within the customer database 610. In an embodiment, the machine learning algorithms may further utilize customer feedback to determine whether the one or more classifier functions utilized by the customer service system 602 may need to be refined. For instance, the service provider may employ one or more analysts that may be tasked with analyzing customer surveys and/or feedback regarding their interaction with service representatives to determine whether the one or more classifier functions utilized by the customer service system 602 result in the selection of service representatives that not only provide proper customer service to the customers, but also make the customers feel comfortable while providing assistance. The one or more analysts may provide input to the machine learning algorithms that, based at least in part on the input, may cause the machine learning algorithms to refine the one or more classifier functions used by the customer service system 602 to improve the selection of service representatives based at least in part on customer input (e.g., log files, customer characteristics, avatar-related data etc.).

In some embodiments, unsupervised machine learning techniques may be used to determine and/or refine a classifier function for matching customers to customer service representatives. Customers may be assigned representatives on some basis (e.g., randomly or using an initial classifier function). At least some customers may provide input about the assignments that were made, such as by providing ratings of customer service representatives that have been assigned and other feedback as described above. These inputs may be used to determine/refine a cost function that is used to train a model, such as a neural network model that can be used to take information about a customer as an input to determine a suitable customer service representative. Unsupervised learning techniques, accordingly, may be used to detect patterns in success of assignments of customers to representatives and the detected patterns can be used to make future assignments.

Once the customer service system 602 has selected an appropriate service representative from the service representative database 612, the customer service system 602 may transmit the customer request for assistance to the service representative's computing device 604. The customer request may include associated customer information from the customer database 610 or obtained from the customer's computing device 606 (e.g., from the log files and/or computed by the customer service system 602 using one or more functions), as well as the issue the customer is trying to have resolved. The service representative computing device 604 may utilize the received customer request to establish a connection to the customer's computing device 606 and engage the customer to resolve the customer's issue.

As noted above, the customer service system may maintain a customer database comprising customer information that may be used, by the customer service system, to select a service representative should a customer require assistance related to a service provided by the service provider. FIG. 7 shows an illustrative example of a customer database 702 comprising a plurality of customer entries in accordance with at least one embodiment. For instance, in this particular illustrative example, the customer database 702 may include at least five distinct categories for customer characteristics, which may include biometric and geographic characteristics for a customer. The customer characteristics that may be included in the customer database 702, in this example, include a customer identifier 704, known languages 706, gender 708, customer location 710 and customer preferences 712, although not all embodiments of the present disclosure will include all such customer characteristics and additional customer characteristics may be included in the customer database 702 in addition to or as an alternative to the customer characteristics explicitly described herein.

The customer identifier column 704 within the customer database 702 may be utilized to identify and distinguish each customer registered to utilize the customer service system. For instance, when a customer registers with the service provider to utilize the customer service system, the service provider may generate a unique customer identifier that may be assigned to the particular customer. Alternatively, the customer may be granted the option to generate his or her own unique customer identifier, which, if accepted by the service provider, may be used to access the customer service system. When a customer submits a request to the customer service system to obtain assistance, the request may include the customer's unique customer identifier, which the customer service system may utilize to find the customer's entry within the customer identifier column 704 of the customer database 702.

When a customer registers with the service provider to utilize the customer service system, the customer may be required to provide additional information that may be included in the customer's entry within the customer database 702. For instance, as illustrated in FIG. 7, the customer database 702 may include a known languages column 706, which may include, for each customer identifier, a listing of the languages that a customer may be familiar or fluent with. For example, a customer, such as Customer A as illustrated in FIG. 7, may specify that he is fluent in both English and Spanish. The customer database 702 may further include a gender column 708, which may include the gender for each customer included in the customer database 702. The location column 710 included in the customer database 702 may include the latest known location of the customer. For instance, the customer may specify his or her location when registering with the service provider to utilize the customer service system. Alternatively, the customer service system may be configured to determine the location of the customer when he or she accesses the customer service system through one or more methods (e.g., GPS location, Internet Protocol tracking, etc.).

The preference column 712 in the customer database 702 may include one or more customer preferences that may be used to identify a service representative that may address a customer's request for assistance. In an embodiment, the service provider can require each customer to specify one or more preferences which may be used by the customer service system to select a service representative to assist the customer should such assistance be required. These one or more preferences may be included in the preference column 712 for later use by the customer service system. In an alternative embodiment, the customer service system is configured to utilize one or more algorithms and the customer characteristics included in the customer database 702, such as the aforementioned known languages, gender and location, to calculate one or more preferences for each customer listed in the customer database 702. These calculated preferences may be added to the preference column 712 of the customer database.

As noted above, the customer service system may access the customer database to obtain a set of preferences that may be used to identify a service representative from a service representative database that may assist the customer. FIG. 8 shows an illustrative example of a service representative database 802 comprising a plurality of service representative entries in accordance with at least one embodiment. For instance, in this particular illustrative example, the service representative database 802 may include at least four distinct categories for service representative characteristics. The service representative characteristics that may be included in the service representative database 802, in this example, include columns for a service representative identifier 804, known languages 806, gender 808 and service representative location 810, although not all embodiments of the present disclosure will include all such service representative characteristics and additional service representative characteristics may be included in the service representative database 802 in addition to or as an alternative to the service representative characteristics explicitly described herein.

The service representative identifier column 804 within the service representative database 802 may be utilized to identify and distinguish each service representative employed by the service provider to provide customer assistance. For instance, when a service representative is issued a computing device to provide customer assistance from a remote location, the service provider may generate a unique service representative identifier that may be assigned to the particular service representative and entered into the service representative identifier column 804. When the service representative utilizes the computing device to access customer information and interact with one or more customers of the service provider, the service representative may be required to provide his or her unique identifier, which the customer service system may utilize to obtain service representative information necessary to evaluate the service representative's surrounding environment and determine which customer requests may be issued to the service representative.

The service representative database 802 may further include a known languages column 806, which may include the one or more languages that each service representative is fluent in. For instance, as illustrated in FIG. 8, Representative A may be fluent only in English while Representative C may be fluent in English, Mandarin and Thai. Each service representative may be required by the service provider to provide a listing of languages he or she is fluent in such that the service provider may provide this known languages column 806. This column may be used to identify any service representatives that are fluent in the language utilized by a customer that has submitted a request for assistance. The service representative database 802 may further include a gender column 808, which may include the gender for each service representative included in the service representative database 802.

As noted above, the computing device issued to each service representative may include a service representative environment application that may be used to evaluate the surrounding environment where the computing device is located. Additionally, this application may utilize one or more peripheral devices installed on the computing device to garner one or more service representative characteristics that may be used to populate the service representative's entry within the service representative database 802. For instance, the application may be able to obtain the location of the computing device through use of a GPS receiver and antenna. The customer service system may utilize this obtained location to populate a location column 810 within the service representative database 802. Since the application may be able to obtain the location of the computing device at different times or as a result of a triggering event, the location included within the location column 810 may change accordingly.

When a customer or other user submits a request for assistance to the customer service system, the customer service system may access the customer database to obtain customer attributes and preferences. This customer information and preferences may be used to select a service representative from a service representative database that may assist the customer.

Figure 9:
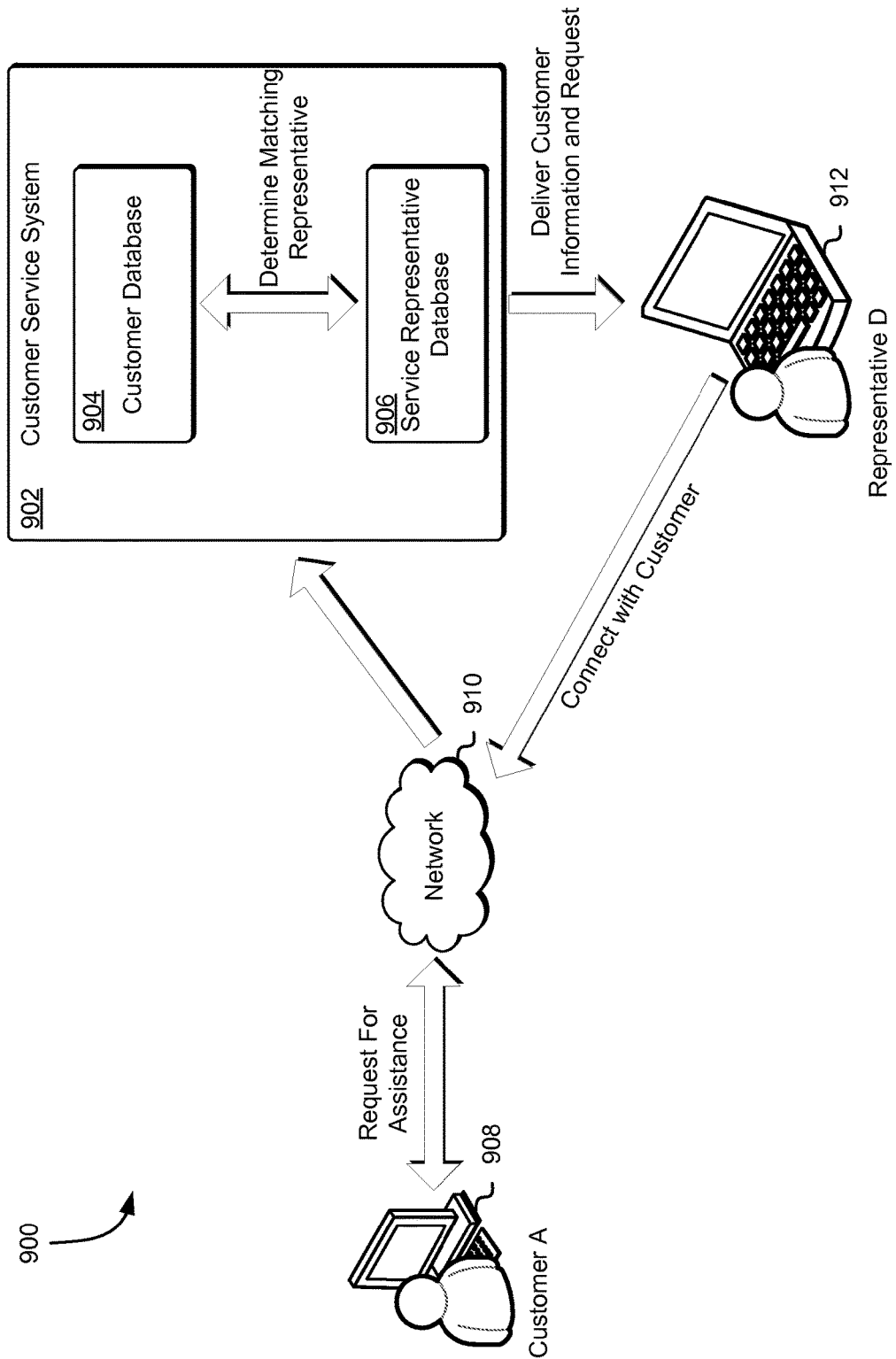
FIG. 9 shows an illustrative example of an environment in which a service representative is selected to provide customer assistance based at least in part on customer preferences and attributes in accordance with at least one embodiment.

FIG. 9 shows an illustrative example of an environment 900 in which a service representative is selected to provide customer assistance based at least in part on customer preferences and attributes in accordance with at least one embodiment. In this particular example, Customer A is a customer of the service provider and may have the one or more attributes illustrated in FIG. 7. For example, as illustrated in FIG. 7, Customer A may be fluent in English and Spanish, male, and located in San Juan, Puerto Rico. Further, Customer Amay have specified that he prefers to interact with a service representative that is located in a similar region, such as Puerto Rico, the Caribbean, or the East Coast of the United States.

While customers of the service provider, such as Customer A, are used extensively throughout the present disclosure for the purpose of illustration, other users may utilize a computing device issued by the service provider to a customer to request assistance. Thus, in an embodiment, when a customer service system 902 receives a request, from a user via the user's computing device, for assistance, the customer service system 902 can transmit one or more executable instructions to the computing device that, when executed by the computing device, may cause the computing device to obtain information regarding the user. This information may be used to identify a service representative that may share one or more attributes or characteristics with the user of the computing device. Additionally, the customer service system 902 may utilize this information to determine whether the user of the computing device is indeed the customer that was issued the computing device by the service provider. In an alternative embodiment, in order to submit a request for assistance, the computing device is configured to utilize one or more peripheral devices installed on the computing device (e.g., microphone, camera, etc.) to obtain information about the customer or other user. This information may be included with the request for assistance to be transmitted to the customer service system 902.

Customer Amay, through a customer computing device 908, submit a request for assistance to the customer service system 902 through a network 910, such as the Internet. The request may include a description of the issue that Customer A is experiencing, as well as other information that may be used to identify Customer A (e.g., username, location, the aforementioned attributes or characteristics obtained from the computing device, etc.). The customer service system 902 may access a customer database 904 to determine whether an entry exists within the customer database 904 for Customer A. If an entry for Customer A exists within the customer database 904, the customer service system 902 may determine whether Customer A has specified one or more preferences that may be used to select a service representative. Since Customer A, as illustrated in FIG. 7, has specified a preference and this preference is included in the customer database 904, the customer service system 902 may utilize this preference (e.g., a service representative within the same region) to select a service representative from a service representative database 906.

The customer service system 902 may access the service representative database 906 to determine whether any service representatives are located in the same region as Customer A, which may be determined based at least in part on a location of the customer computing device 908. Using the listing of service representatives illustrated in FIG. 8, the customer service system 902 may determine that Representative D is the only service representative located in the same region (Cerro Gordo and San Juan are both in Puerto Rico) as Customer A. Thus, the customer service system 902 may select Representative D to respond to Customer A's 908 request for assistance. In an embodiment, if more than one service representative listed in the service representative database 906 satisfied Customer A's 908 preference to interact with a service representative from his region, the customer service system 902 may perform one or more calculations to select an appropriate service representative. For instance, the customer service system 902 may select the service representatives that are within the same region as Customer A. Subsequently, the customer service system 902 may utilize Customer A's 908 attributes and characteristics listed in the customer database 904 to determine if the selected service representatives share any of these attributes and characteristics. The customer service system 902 may rank these selected service representatives from the service representative database 906 and select the highest ranked service representative to respond to the request for assistance.

Once the customer service system 902 has selected Representative D from the service representative database 906 to respond to the request for assistance, the customer service system 902 may deliver the request and supplemental customer information regarding Customer A to Representative D via a computer system 912 of Representative D. Representative D may utilize his/her computing device 912 to transmit, through the network 910, one or more executable instructions to Customer A's computing device 908 that, when executed by Customer A's computing device 908, may cause Customer A's computing device 908 to connect to Representative D's 912 computing device. Thus, through this connection, Representative D may be able to interact with Customer A to resolve Customer A's 908 request for assistance through their respective computing devices 908, 912 via the network 910.

As noted above, a customer service system may include a plurality of components that may be utilized to ensure that service representatives located in remote locations provide a suitable environment conducive to interaction with customers of the service provider, as well as to ensure that customer requests for assistance are resolved by service representatives that may satisfy customer preferences and may have similar attributes and characteristics as the customer.

Figure 10:
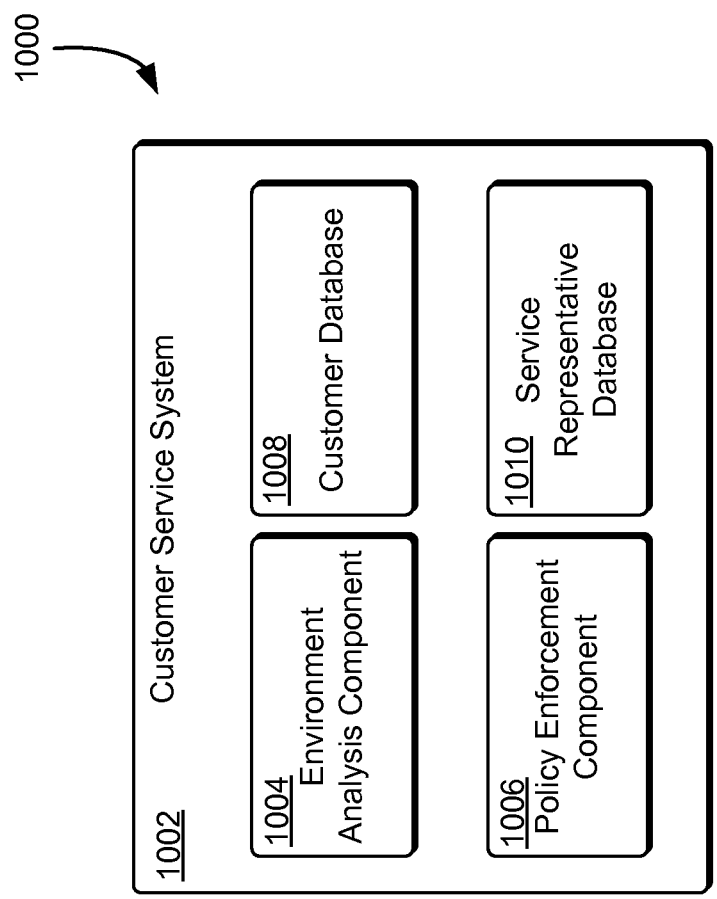
FIG. 10 shows an illustrative example of an environment that includes one or more components of a customer service system in accordance with at least one embodiment.

FIG. 10 shows an illustrative example of an environment 1000 that includes one or more components of a customer service system 1002 in accordance with at least one embodiment. As illustrated in FIG. 10, the customer service system 1002 may interact with one or more components to provide customer assistance upon request and ensure service representatives in remote locations provide a secure and amenable environment conducive to interaction with customers. For instance, in this particular illustrative example, the customer service system 1002 may interact with at least four different components. The components that may be included within the customer service system 1002, in this example, include an environment analysis component 1004, a policy enforcement component 1006, a customer database 1008 and a service representative database 1010, although not all embodiments of the present disclosure will include all such components and additional components may be included within the customer service system 1002 in addition to or as an alternative to the components explicitly described herein.

The environment analysis component 1004 may comprise one or more hardware resources (e.g., hardware servers, data storage devices, network devices, processors and other equipment) configured to perform one or more analyses based at least in part on environment measurements received from a computing device issued to a service representative. The environment analysis component 1004 may utilize these received environment measurements to determine whether the surrounding environment where the service representative is utilizing the computing device is suitable for interaction with one or more customers of the service provider and users of the customer service system 1002. For instance, the environment analysis component 1004 may include a database comprising a listing of minimum requirements for one or more environment metrics. These environment metrics may include decibel levels, light intensity, number of individuals within the surrounding environment, facial features (e.g., hair color, eye color, facial geometry, etc.) and the like. Further, the database may comprise a listing of known acceptable values for the surrounding environment for each individual service representative. These acceptable values may have been obtained through a previous analysis of the surrounding environment for the service representative that satisfied the minimum requirements, defined by the service provider, for the one or more environment metrics. The environment analysis component 1004 may be configured to interact with a policy enforcement component 1006 to provide one or more commands, such as through one or more API calls to the component, to utilize the results of the analyses to enforce one or more policies for communicating with customers of the service provider.

The policy enforcement component 1006 may comprise one or more hardware resources (e.g., hardware servers, data storage devices, network devices, processors and other equipment) configured to enforce one or more policies applicable to service representatives utilizing computing devices in remote locations to provide customer assistance. Additionally, the policy enforcement component 1006 may be configured to transmit executable instructions to a computing device issued to a service representative by the service provider in order to cause an application installed on the computing device to perform mitigating actions should the surrounding environment not satisfy the minimum requirements described above. The policy enforcement component 1006 may also transmit executable instructions to the computing device to enable the service representative to interact with customers of the service provider should the surrounding environment satisfy the minimum requirements for the environment and are within the known baseline environment metrics for the particular service representative.

The customer database 1008 may include a listing of one or more customers of the service provider, as well as a listing of characteristics and preferences for each of these one or more customers. For instance, when a customer initially establishes a relationship with the service provider (e.g., creates a new account, utilizes a device provided to the customer by a service provider for accessing the customer service 1002, etc.), the customer may be required to provide information regarding him or herself. For example, the customer may provide his or her name, home mailing address, billing address, age range, gender, known languages and the like. Further, the customer may be given the opportunity to define one or more preferences, which may be used by the customer service system 1002 to identify a service representative that may assist the customer should the need arise. In an embodiment, if the customer has not specified one or more preferences which may be used to select a service representative, the customer service system 1002 can access the customer database 1008 and, based at least in part on the information included within the customer database 1008 associated with the customer, utilize one or more algorithms to generate one or more preferences, which may then be stored within the customer database 1008.

The service representative database 1010 may include a listing of one or more service representatives of the customer service system 1002 to provide assistance to the customers of the service provider. The service representative database 1010 may additionally include a listing of one or more characteristics for each of the one or more service representatives employed by the service provider. These characteristics may be similar to those included in the customer database 1008. The customer service system 1002 may utilize the customer's preferences from the customer database 1008 to identify one or more service representatives from the service representative database 1010 that may satisfy these preferences.

Figure 11:
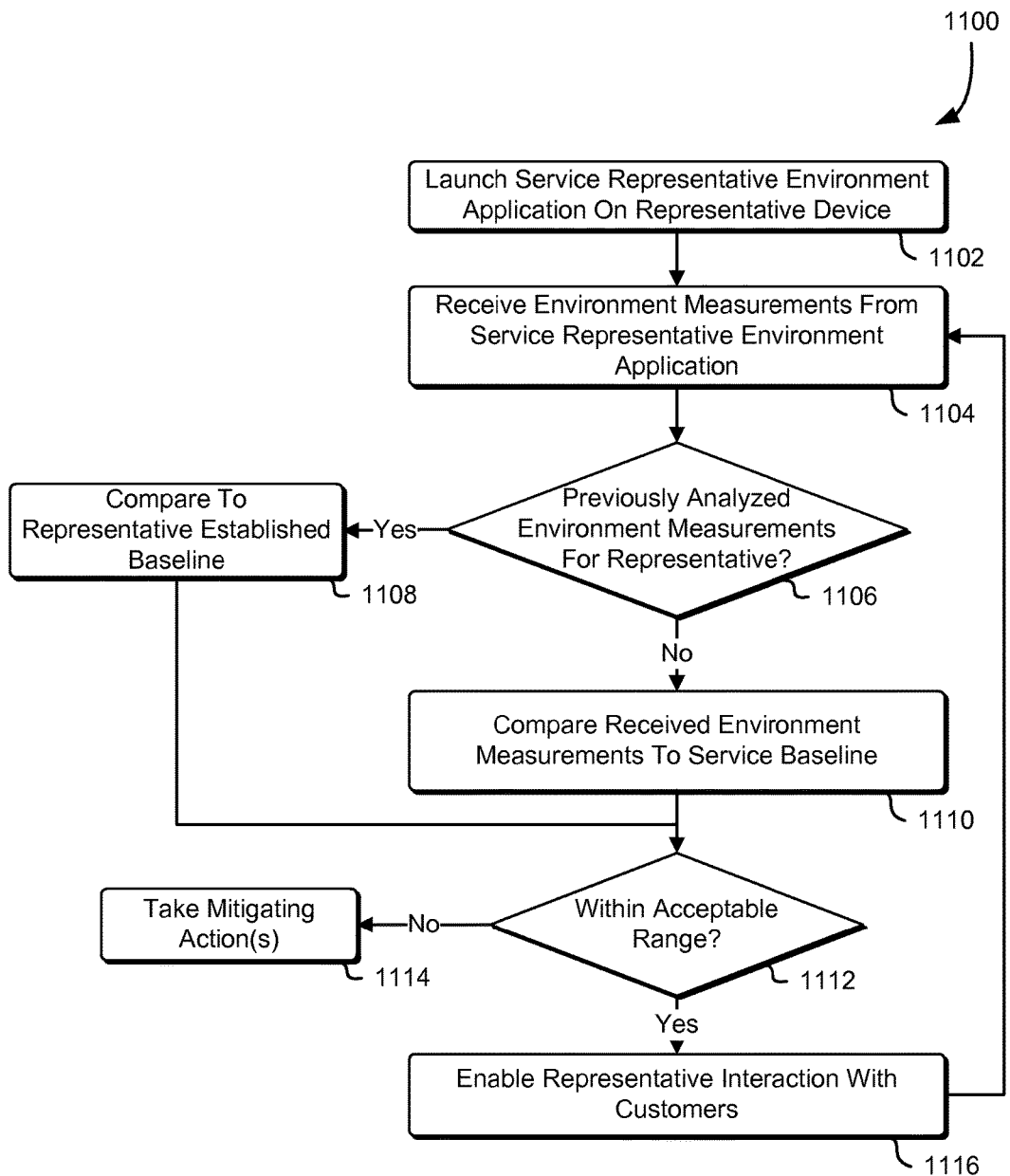
FIG. 11 shows an illustrative example of a process for analyzing a service representative environment to determine whether to allow a service representative to interact with customers in accordance with at least one embodiment.

FIG. 11 shows an illustrative example of a process 1100 for analyzing a service representative environment to determine whether to allow a service representative to interact with customers in accordance with at least one embodiment. The process 1100 may be performed by an environment analysis component of a customer service system that is configured to obtain environment measurements, over a network, from a computing device located in a remote location and issued to a service representative by the service provider. Additionally, the environment analysis component may be configured to transmit executable instructions to the computing device to initialize a scan of the surrounding environment where the computing device is located. In addition to the environment analysis component, the process 1100 may be performed by a policy enforcement component of the customer service system that is configured to receive the results of the one or more analyses performed by the environment analysis component and perform one or more actions in accordance with these results and the one or more policies established by the service provider.

In an embodiment, the environment analysis component is configured to transmit one or more executable instructions to a computing device provided to a service representative employed by the service provider to provide assistance to customers of the service provider. These one or more executable instructions may cause the computing device to launch 1102 a service representative environment application on the service representative's computing device. As noted above, the service representative environment application may be configured to interact with one or more peripheral devices installed on the computing device to obtain one or more environment measurements. For instance, the service representative environment application may initiate a camera installed on the computing device to obtain a pictographic representation of the surrounding environment. In an alternative embodiment, the process 1100 does not include launching the service representative environment application on the service representative's device, as the service representative may be required to personally launch the application from the computing device. Thus, the environment analysis component of the computing service need not transmit the executable instructions to launch the application.

Once the service representative environment application has obtained environment measurements from one or more of the peripheral devices installed on the service representative's computing device, the application may transmit these measurements to the environment analysis component to initiate analysis of these measurements. Accordingly, the environment analysis component may receive 1104 these environment measurements from the service representative environment application in order to determine whether these measurements are acceptable.

As noted above, the environment analysis component may include a database comprising a listing of minimum requirements for one or more environment metrics. These environment metrics may include decibel levels, light intensity, number of individuals within the surrounding environment, facial features (e.g., hair color, eye color, facial geometry, etc.) and the like. Further, the database may comprise a listing of known acceptable values for the surrounding environment for each individual service representative. These acceptable values may have been obtained through a previous analysis of the surrounding environment for the service representative that satisfied the minimum requirements, defined by the service provider, for the one or more environment metrics. Accordingly, the environment analysis component may be configured to determine 1106 whether this database includes previously analyzed environment measurements for this particular service representative.

If the database comprises previously analyzed environment measurements for the service representative, the environment analysis component may compare 1108 the received environment measurements to the established baseline environment metrics for this particular service representative. These established baseline environment metrics may satisfy the minimum requirements established by the service provider to ensure that the service representative is in a location that is conducive to providing assistance to customers of the service provider. However, if this the first time the service representative has utilized his device to access the customer service system and interact with customers of the service provider, the environment analysis component may not have any known environment measurements for this particular service representative. In such an instance, the environment analysis component may instead compare 1110 the received environment measurements to the service baseline environment metrics (e.g., minimum requirements for the environment to be acceptable).

Once the environment analysis component has analyzed the received environment measurements, based at least in part on whether the environment analysis component has previously analyzed environment measurements for the service representative, the environment analysis component may determine 1112 whether the received environment measurements are within an acceptable range. For instance, if the received environment measurements were compared to the minimum requirements mentioned above (e.g., no previous environment measurements were analyzed), the environment analysis component may determine whether the received measurements satisfy these minimum requirements. Alternatively, if the received environment measurements were compared to the established baseline environment metrics for this particular service representative, the environment analysis component may determine whether the received measurements sufficiently vary from the established baseline environment metrics as to present a potential issue. Additionally, if there is a potential issue, the environment analysis component may compare the received environment measurements to the minimum requirements mentioned above.

If the received measurements do fall outside of the acceptable range for the established baseline environment metrics for the service representative and/or the minimum requirements established by the service provider, the environment analysis component may transmit one or more commands to a policy enforcement component of the customer service system that may cause the policy enforcement component to take 1114 one or more mitigating actions. For instance, the policy enforcement component may be configured to transmit one or more executable instructions to the service representative environment application that, when executed by the application, may cause the application to inform the service representative that the surrounding environment is not acceptable for customer interaction. Additionally, the service representative environment application may subsequently terminate, requiring the service representative to again initialize the application and start another scan of the surrounding environment to determine whether the particular issues have been addressed. In an embodiment, if the received environment measurements satisfy the minimum requirements established by the service provider but include sufficient variance from the previously established baseline environment metrics for the service representative, the policy enforcement component can transmit one or more executable instructions to the service representative environment application that, when executed by the application, may cause the application to obtain additional environment measurements over a period of time to determine whether these new environment measurements may be used to establish new baseline environment metrics for the service representative.

If the received measurements do fall within the acceptable range for the established baseline environment metrics for the service representative and/or the minimum requirements established by the service provider, the environment analysis component may transmit one or more commands to the policy enforcement component that may cause the policy enforcement component to enable 1116 the service representative to utilize the computing device to interact with customers of the service provider and access customer information. For instance, the policy enforcement component may be configured to transmit one or more executable instructions to the service representative environment application installed on the computing device that, when executed by the application, may cause the application to enable the service representative to connect to customers of the service provider and provide assistance as needed. Further, the executable instructions may cause the application to periodically or as a result of a triggering event (e.g., another individual is detected, noise levels increase, etc.) obtain a new set of environment measurements and transmit these measurements to the environment analysis component for additional analyses.

Figure 12:
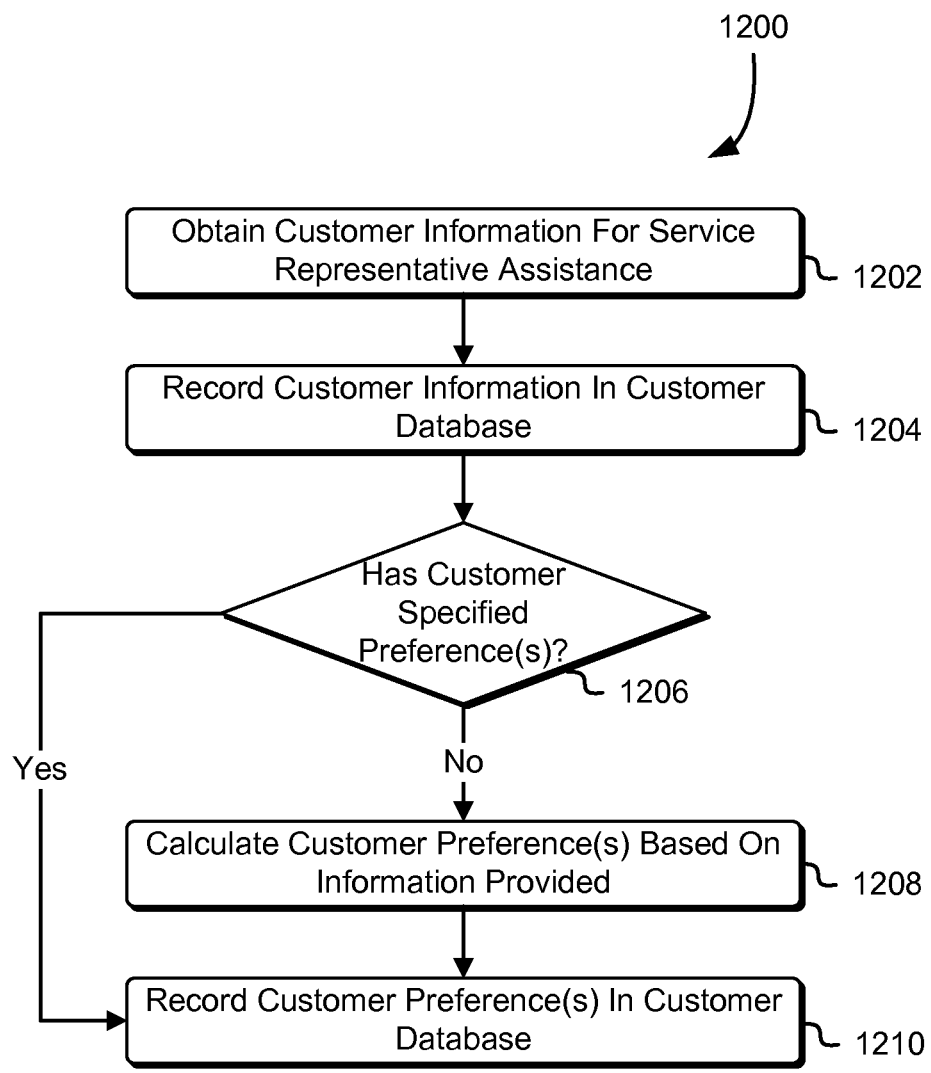
FIG. 12 shows an illustrative example of a process for recording one or more customer preferences based at least in part on customer information and/or explicit customer preference input in accordance with at least one embodiment.

As noted above, the customer service system may include a customer database comprising one or more entries for each customer of the service provider. For instance, each entry for a customer within the customer database may include one or more attributes or characteristics of the customer, such as the customer's known languages, location, gender, hair color, eye color and the like. Additionally, the customer database may include one or more preferences for characteristics or attributes a customer may find favorable for selecting a service representative. FIG. 12 shows an illustrative example of a process 1200 for recording one or more customer preferences based at least in part on customer information and/or explicit customer preference input in accordance with at least one embodiment. The process 1200 may be performed by a customer service system comprising a customer database usable to record one or more customer entries detailing customer attributes or characteristics and preferences that may be used to select a service representative if the customer requires assistance in utilizing a service provided by the service provider.

When a customer of the service provider submits a request for assistance in addressing an issue related to a service provided by the service provider, the customer may provide additional information that may be used by the customer service system to identify the customer and select an appropriate service representative to assist the customer. For instance, this additional information may include a username or other credential information for the customer, the current location of the customer and a description of the relevant issue that the customer would like addressed by a service representative. The customer service system may obtain 1202 customer information from the customer necessary for obtaining assistance from a service representative.

Once the customer service system has obtained the customer information, along with the request for assistance, the customer service system may record 1204 the customer information into the customer database. For instance, if the customer information provided differs from the entries included in the customer database for the customer, the customer service system may use this information to update the entries for the customer within the customer database. Alternatively, if the customer is communicating with the customer service system for the first time, the customer service system may use the customer information to create one or more new entries within the customer database for later use.

As noted above, the customer database may include, for each customer, a set of preferences which may be used to identify a service representative that may assist the customer in resolving any issues related to a service provided by the service provider and that shares some characteristics or attributes with the customer. The customer service system may determine 1206 whether the customer has specified, within the customer information provided to the customer service system or within the customer database, any preferences that may be used for selecting a service representative. If the customer has not provided a set of preferences within the customer information and the customer database does not include any preferences, the customer service system may utilize the characteristics and attributes of the customer to calculate 1208 one or more customer preferences based at least in part on the customer information provided. For instance, the customer service system may be able to review the customer's purchase history to determine any customer preferences. For example, if the customer has previously purchased numerous quantities of football gear, the customer service system may determine that the customer is an avid football fan and, thus, may have a preference to interact with a service representative that is also an avid football fan.

Once the customer service system has calculated the customer preferences based at least in part on the customer information provided or if the customer has provided a set of preferences within the customer information, the customer service system may record 1210 these customer preferences into the customer database under the customer's entry. When a customer, at a later time, submits a request for assistance, the customer service system may be able to access the customer database, obtain the set of preferences for the customer and identify an appropriate service representative that may assist the customer. It should be noted that the process 1200 may include additional, fewer or alternative steps. For instance, in some embodiments, the customer service system does not calculate or record customer preferences for each customer. Thus, the customer service system may utilize the customer information included in the customer database to rank the available service representatives and, based at least in part on this ranking, select a service representative to assist the customer.

Figure 13:
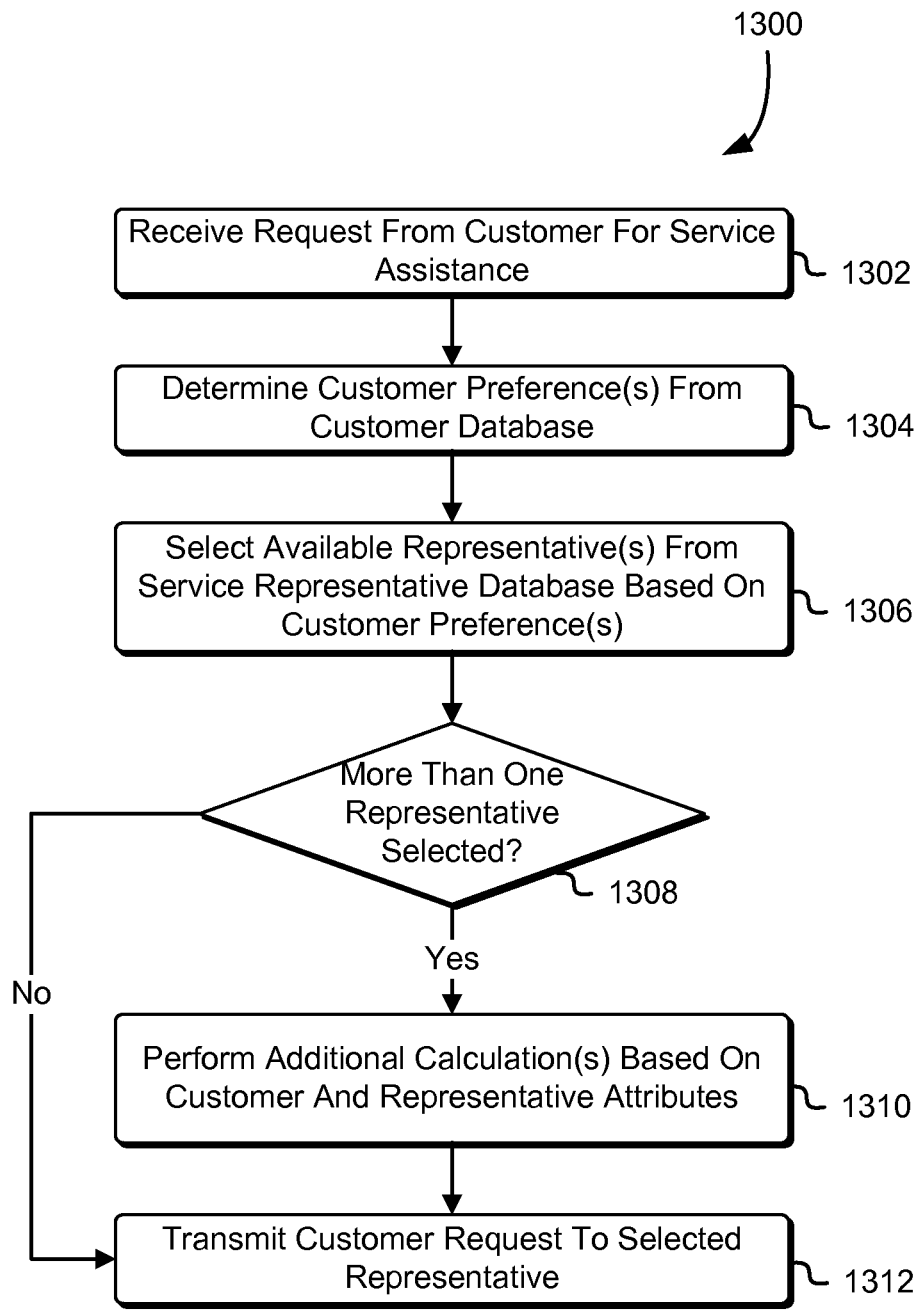
FIG. 13 shows an illustrative example of a process for selecting a service representative based at least in part on customer preferences stored in a customer database in accordance with at least one embodiment.

As noted above, the customer service system may be configured to select a service representative based at least in part on customer attributes, characteristics and/or preferences stored within a customer database. FIG. 13 shows an illustrative example of a process 1300 for selecting a service representative based at least in part on customer preferences stored in a customer database in accordance with at least one embodiment. The process 1300 may be performed by a customer service system that includes a customer database and a service representative database. The service representative database may include one or more entries for each service representative employed by the service provider to assist customers of the service provider should the need arise. Similar to the customer database described above, the service representative database may include one or more attributes or characteristics of the service representative, such as the service representative's known languages, location, gender, hair color, eye color and the like.

At any point, the customer service system may receive 1302 a request from a customer for service assistance. The request may include descriptive information as to the issue the customer would like to have resolved with regard to his or her experience with a service provided by the service provider. Further, the request may include other customer information, such as a customer identifier, which may be used by the customer service system to locate an entry within the customer database for the customer. The request may also include the current location of the customer. This location may differ from the location listed in the customer database. The customer service system may update the customer database to include this new location for the customer.

Once the customer service system has received the request for assistance from the customer, the customer service system may utilize the customer database to determine 1304 one or more customer preferences. For instance, as described above in connection with FIG. 12, the customer service system may be configured to utilize the customer information in the customer database to calculate one or more preferences if the customer has not previously provided one or more preferences to the customer service system. Alternatively, if the customer has previously provided one or more preferences to the customer service system, these one or more preferences may be recorded in the customer database. The customer service system may obtain these one or more preferences to select an appropriate service representative.

The customer service system may subsequently access the service representative database to select 1306 one or more available service representatives based at least in part on the identified customer preferences. As noted above, the service representative database may include one or more service representative attributes for each service representative. The service representative database may include similar categories as those included in the customer database to facilitate the analysis required to select the one or more service representatives from the service representative database. Based at least in part on the customer preferences, the customer service system may determine 1308 whether more than one service representative may respond to the customer's request for assistance.

If the customer service system has selected more than one service representative based at least in part on the customer's preferences, the customer service system may perform 1310 additional calculations based at least in part on the customer and service representative attributes to select a single service representative. For instance, if a customer has specified that he or she prefers to be assisted by a service representative located in the same region as the customer, but two or more service representatives are located in this same region, the customer service system may evaluate the customer database to identify other attributes of the customer. Subsequently, the customer service system may utilize these other attributes and compare these to the attributes of the selected service representatives. The customer service system may rank the selected service representatives based at least in part on matching attributes between the customer and the service representative. For example, if the customer additional knows English and Spanish and is located in Huntsville, Ala., a service representative may be ranked higher if he or she also knows English and Spanish and is in closer proximity to Huntsville, Ala. than the other selected service representatives. It should be noted that the calculations described above are included for illustrative purposes and other calculations and heuristics may be utilized to select a service representative from a listing of two or more service representatives.

Once the customer service system has performed the additional calculations required to select a single service representative or only one service representative was initially selected based at least in part on the customer's preferences, the customer service system may transmit 1312 the customer's request for assistance to the selected service representative. Additionally, the customer service system may provide the selected service representative with customer account information, which may be useful for identifying the source of the customer's issue. Further, the customer service system may inform the selected service representative as to how he or she was selected, namely the similar attributes that the customer and service representative may share. This may enable the selected service representative to provide appropriately tailored assistance to the customer.

As noted above, the customer service system may receive requests for assistance from not only customers of the service provider but other users as well. For instance, in an embodiment, the customer can utilize a computing device, provided to the customer by the service provider, to access one or more services provided by the service provider, as well as the customer service system. The customer may allow other users to utilize the computing device and, accordingly, submit a request for service assistance if necessary. Thus, the customer service system may need to identify an appropriate service representative through other methods than using the customer database to obtain one or more customer attributes and preferences. FIG. 14 shows an illustrative example of a process 1400 for dynamically selecting a service representative based at least in part on one or more customer attributes obtained when a customer submits a request for assistance in accordance with at least one embodiment. The process 1400 may be performed by a customer service system configured to interact with a customer database and a service representative database to select an appropriate service representative that may assist the customer or other user. Additionally, the customer service system may be configured to transmit one or more executable instructions to the customer's computing device that, when executed by the device, may cause the device to utilize one or more peripheral devices installed on the computing device, including multiple sensors installed on the computing device, to capture and obtain one or more attributes (e.g., personal characteristics, physical characteristics, other user information etc.) for the customer or other user and, subsequently, transmit these attributes to the customer service system.

At any point, the customer service system may receive 1402 a request from a user of a computing device issued to a customer of the service provider for service assistance. The request may include descriptive information as to the issue the user would like to have resolved with regard to his or her experience with one or more services provided by the service provider. Further, the request may include other customer information associated with the customer who was issued the computing device, such as a customer identifier, which may be used by the customer service system to locate an entry within the customer database for the customer. The request may also include the current location of the computing device. This location may differ from the location listed in the customer database.

Once the customer service system has received the request for assistance from a user of the computing device, the customer service system may determine 1404 one or more user attributes that may be used to select an appropriate service representative. For instance, in an embodiment, the customer service system transmits one or more executable instructions to the computing device that, when executed by the computing device, may cause the computing device to utilize one or more peripheral devices installed on the computing device to obtain one or more personal characteristics for the user. For example, if the computing device includes a camera, the computing device may initialize the camera to obtain a pictographic representation of the user utilizing the computing device. Additionally, this pictographic representation may further include other details that may be used to determine the personal characteristics of the user. In an alternative embodiment, the user personal characteristics are included with the request received from the user of the computing device. For instance, in order to submit a request to the customer service system, the computing device may need to obtain a pictographic or other visual representation of the user, which is then transmitted to the customer service system with the request. While pictographic representations and cameras are used throughout the present disclosure for the purpose of illustration, other peripheral devices may be used to obtain user personal characteristics. These may include microphones, motion sensors, light sensors, GPS receivers and the like.

Based at least in part on the user attributes, the customer service system may access the customer database and determine 1406 whether these user personal characteristics match the existing attributes listed in the customer database for the customer who was issued the computing device. If the determined user personal characteristics do not match the attributes for the existing customer, the customer service system may utilize 1408 these user attributes to create one or more representative criteria that may be used to select 1412 an available service representative from the service representative database. These one or more representative criteria may be similar to the customer preferences that may be included within the customer database as described above. If the user attributes do match the existing attributes for the customer that was issued the computing device by the service provider, the customer service system may determine 1410 the customer preferences from the customer database, as described above in connection with FIG. 13, and select 1412 an appropriate, available service representative from the service representative database.

Similar to the process described above in connection with FIG. 13, the customer service system may determine 1414 whether more than one service representative may assist the user of the computing device. If the customer service system has selected more than one service representative based at least in part on the customer's preferences or the representative criteria created based at least in part on the user attributes, the customer service system may perform 1416 additional calculations based at least in part on the user and service representative attributes to select a single service representative. If the customer service system was only able to identify, based at least in part on the customer preferences or representative criteria, a single service representative that may assist the user with a particular issue, or the a single service representative is selected based at least in part on the additional calculations, the customer service system may transmit 1418 the user request to the selected service representative. Additionally, the customer service system may provide the selected service representative with user information, which may be useful for identifying the source of the user's issue. Further, the customer service system may inform the selected service representative as to how he or she was selected, namely the similar attributes that the user and service representative may share.

In an embodiment, the customer service system may transmit executable instructions to the selected service representative's computer device that may cause the computer device to utilize an adaptive background screen located within the selected service representative's environment to display one or more images. These one or more images may be displayed based at least in part on one or more personal characteristics of the user or customer that has submitted a request for assistance. For instance, the computing device may transmit one or more executable instructions to the adaptive background screen, such as through one or more wireless communications methods (e.g., WiFi, Bluetooth®, etc.), to cause the adaptive background screen 308 to display the one or more images.

Figure 15:
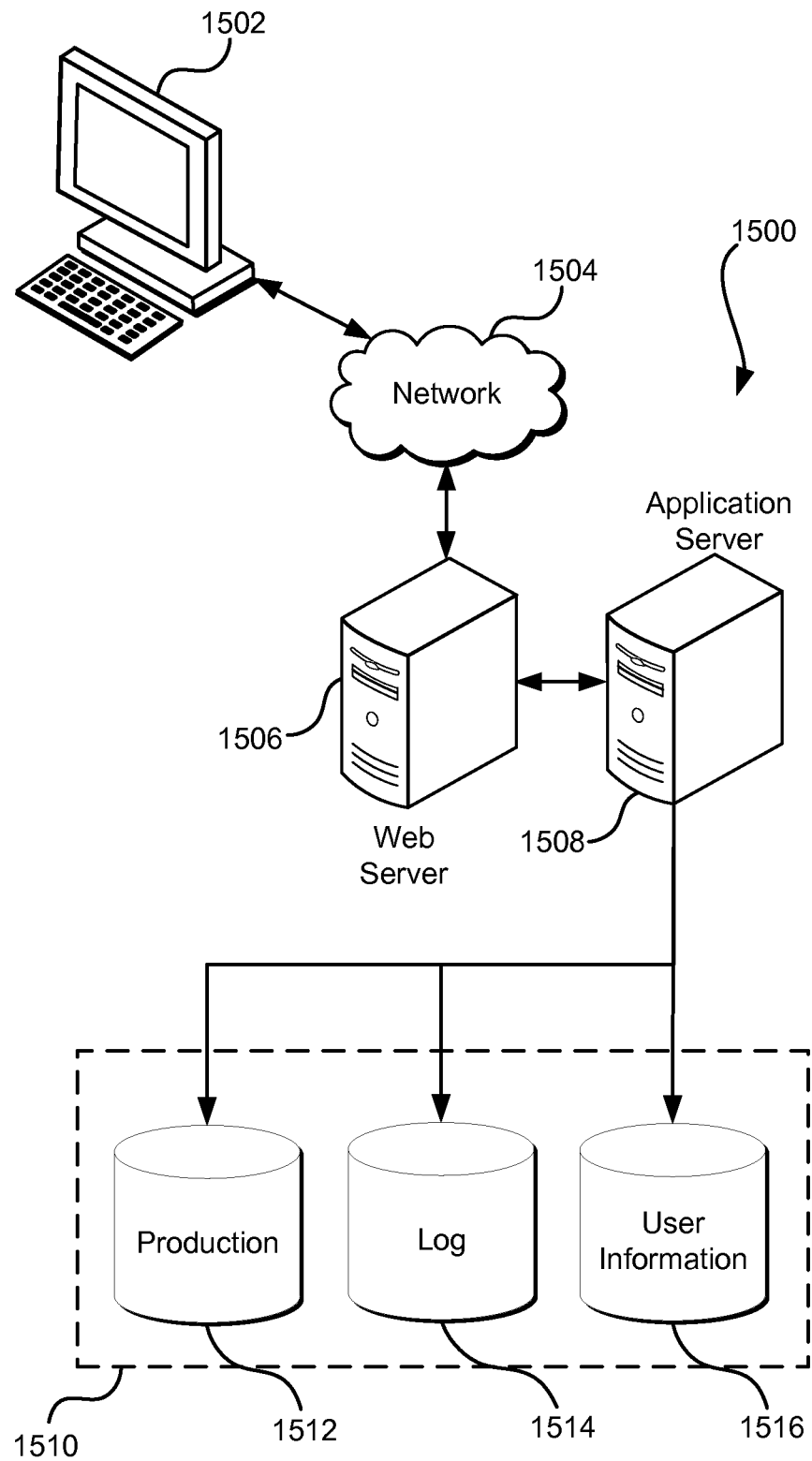
FIG. 15 illustrates an environment in which various embodiments can be implemented.

FIG. 15 illustrates aspects of an example environment 1500 for implementing aspects in accordance with various embodiments. As will be appreciated, although a web-based environment is used for purposes of explanation, different environments may be used, as appropriate, to implement various embodiments. The environment includes an electronic client device 1502, which can include any appropriate device operable to send and/or receive requests, messages or information over an appropriate network 1504 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1502 and the application server 1508, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1510 can include several separate data tables, databases, data documents, dynamic data storage schemes and/or other data storage mechanisms and media for storing data relating to a particular aspect of the present disclosure. For example, the data store illustrated may include mechanisms for storing production data 1512 and user information 1516, which can be used to serve content for the production side. The data store also is shown to include a mechanism for storing log data 1514, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. The application server 1508 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1502. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of the disclosure can be described in view of the following clauses:

1. A non-transitory computer-readable storage medium having stored thereon executable instructions that, when executed by one or more processors of a computer system, cause the computer system to at least:

receive, from a customer computing device, a customer request for assistance, the customer request fulfillable by enabling communication between the customer computing device and a service representative computing device;

receive, from the service representative computing device, one or more environment measurements from an environment where the service representative is located;

analyze the received one or more environment measurements to determine if the one or more measurements satisfy a plurality of threshold requirements for the environment; and enable, if the environment measurements do satisfy the plurality of threshold requirements for the environment, communication between the customer computing device and the service representative computing device.

2. The non-transitory computer-readable storage medium of clause 1, wherein the instructions further comprise instructions that, when executed by the one or more processors, cause the computer system to transmit, prior to receiving the one or more environment measurements, one or more executable instructions to the service representative computing device that, when executed by the service representative computing device, cause the service representative computing device to obtain the one or more environment measurements.

3. The non-transitory computer-readable storage medium of clauses 1 and 2, wherein the instructions further comprise instructions that, when executed by the one or more processors, cause the computer system to:

analyze the received one or more environment measurements to determine if the one or more measurements satisfy one or more baseline metrics established based at least in part on an analysis of the environment where the service representative is located, the analysis of the environment conducted prior to receiving the customer request; and transmit, if the environment measurements do not satisfy the one or more baseline metrics, the one or more executable instructions to the service representative computing device that, when executed by the service representative computing device, cause the service representative computing device to perform one or more mitigating actions.

4. The non-transitory computer-readable storage medium of clauses 1-3, wherein to enable communication between the customer computing device and the service representative computing device further includes permitting the service representative to access, using the service representative computing device, customer information for the customer.

5. A system, comprising:

at least one computing device configured to implemented one or more services, wherein the one or more services are configured to:

obtain, from a representative computing device used by a representative of the one or more services, one or more environment measurements of a surrounding environment where the representative computing device is located;

determine if the one or more measurements satisfy one or more criteria; and cause one or more actions to be performed based at least in part on the determination.

6. The system of clause 5, wherein the one or more environment measurements are obtained, by the representative computing device, by further utilizing one or more components associated with the representative computing device to measure the surrounding environment where the representative computing device is located.

7. The system of clauses 5 and 6, wherein the one or more criteria further include a plurality of minimum requirements for the surrounding environment where the representative computing device is located and one or more baseline metrics established based at least in part on an analysis of the surrounding environment where the representative computing device is located, the analysis of the surrounding environment conducted prior to receiving the one or more environment measurements.

8. The system of clauses 5-7, wherein the one or more services are further configured to: utilize one or more functions to determine if the one or more measurements satisfy the one or more criteria, the one or more functions configured to utilize at least the one or more environment measurements as input and the one or more functions developed by providing the one or more environment measurements to a human;

provide the one or more environment measurements of the surrounding environment to a human for a human determination whether the surrounding environment satisfies the one or more criteria; and update the one or more functions based at least in part on the human determination.

9. The system of clauses 5-8, wherein the one or more services are further configured to, prior to receiving the one or more environment measurements, transmit one or more executable instructions to the representative computing device that, when executed by the representative computing device, cause the representative computing device to obtain the one or more environment measurements.

10. The system of clauses 5-9, wherein the one or more services are further configured to enable the representative computing device to be utilized by the representative of the one or more services to interact with one or more customer devices utilized by one or more customers of the one or more services if the one or more environment measurements satisfy the one or more criteria.

11. The system of clauses 5-10, wherein the one or more mitigating actions further include: preventing the representative computing device from being used to interact with at least one customer of the one or more services; and transmitting one or more executable instructions to the representative computing device that, when executed by the representative computing device, cause the representative computing device to obtain additional environment measurements to determine if the additional environment measurements satisfy the one or more criteria.

12. The system of clauses 5-11, wherein the one or more environment measurements from the representative computing device are further received in response to a customer request for assistance fulfillable by enabling communication between the customer and the representative through the representative computing device.

13. A computer-implemented method for evaluating an environment where a representative is located to determine whether the representative can respond to customer requests for assistance, comprising:

under the control of one or more computer systems configured with executable instructions, analyzing one or more environment measurements received from a computing device operated by a representative of one or more services to determine if an environment where the computing device is located satisfies one or more criteria for environments of representatives; and enabling, if the environment measurements do satisfy the one or more criteria, the computing device to be utilized by the representative of the one or more services to interact with at least one customer device utilized by a customer of the one or more services.

14. The computer-implemented method of clause 13, further comprising, prior to receiving the one or more environment measurements, transmitting one or more executable instructions to the computing device that, when executed by the computing device, cause the computing device to obtain the one or more environment measurements.

15. The computer-implemented method of clauses 13 and 14, wherein the one or more criteria further include one or more minimum requirements for the environments of representatives and one or more baseline metrics established based at least in part on an analysis of the environment where the computing device is located, the analysis of the environment conducted prior to receiving the one or more environment measurements.

16. The computer-implemented method of clauses 13-15, wherein analyzing the one or more measurements further includes:
providing the one or more environment measurements into one or more functions as input to determine, based at least on the one or more environment measurements, if the environment satisfies the one or more criteria;
receiving a human-made determination as to whether the environment satisfies the one or more criteria; and
updating the one or more functions based at least in part on the human-made determination.

17. The computer-implemented method of clauses 13-16, wherein enabling computing device to be utilized by the representative of the one or more services to interact with the at least one customer device utilized by the customer of the one or more services further includes permitting the representative to access, using the computing device, customer information for the customer of the one or more services.

18. The computer-implemented method of clauses 13-17, wherein the one or more environment measurements from the computing device are further received in response to a customer request for assistance fulfillable by enabling communication between the customer and the representative through the computing device.

19. The computer-implemented method of clauses 13-18, wherein the computing device further includes an application configured to access and utilize one or more devices of the computing device to obtain the environment measurements and transmit the environment measurements to the computer system.

20. The computer-implemented method of clauses 13-19, wherein:
the method further comprises causing the computing device to perform one or more mitigating actions if the environment measurements do not satisfy the one or more criteria; and
the one or more mitigating actions include:
preventing the computing device from being used to access data associated with one or more customers of the one or more services;
preventing the computing device from being used to interact with at least one customer of the one or more services; and
transmitting one or more executable instructions to the representative computing device that, when executed by the representative computing device, cause the representative computing device to obtain additional environment measurements to determine if the additional environment measurements satisfy the one or more criteria.

21. A non-transitory computer-readable storage medium having stored thereon executable instructions that, when executed by one or more processors of a computer system, further cause the computer system to at least:
receive, from a customer computing device, a request for assistance fulfillable by one of a plurality of service representatives;
retrieve, based at least in part on the request, one or more customer attributes of a customer, the one or more customer attributes including biometric and geographic characteristics associated with the customer;
access a service representative database comprising identifiers for the plurality of service representatives and, for one or more service representatives of the plurality of service representatives, one or more service representative attributes, the one or more service representative attributes including biometric and geographic characteristics for the one or more service representatives;
select a service representative from the plurality of service representatives based at least in part on an analysis of the one or more service representative attributes and the one or more customer attributes; and
enable a computing device utilized by the selected representative to communicate with the customer computing device.

22. The non-transitory computer-readable storage medium of clause 21, wherein retrieving the one or more attributes of the customer further includes transmitting executable instructions to the customer computing device that, when executed by the customer computing device, cause the customer computing device to utilize one or more devices to obtain the one or more attributes.

23. The non-transitory computer-readable storage medium of clauses 21 and 22, wherein the one or more customer attributes further include one or more customer preferences for specified attributes of a service representative such that selecting a service representative from the plurality of service representatives is further based at least in part on the customer preferences.

24. The non-transitory computer-readable storage medium of clauses 21-23, wherein enabling the selected service representative to utilize the computing device to communicate with the customer computing device further includes transmitting a notification to the selected service representative, the notification including information as to how the selected service representative was selected.

25. A computer system, comprising:
one or more processors; and
memory having stored therein instructions that, when executed by the computer system, further cause the computer system to:
obtain one or more personal characteristics of a user in response to a request for assistance from a computing device utilized by the user, the one or more personal characteristics captured by one or more components of the computing device utilized by the user for capturing visual information;
access a representative database comprising one or more personal characteristics of one or more representatives of a plurality of representatives; and
select, based at least in part on an analysis of the one or more personal characteristics of the user and the one or more personal characteristics of the one or more representatives, a representative from the plurality of representatives.

26. The computer system of clause 25, wherein:
the one or more personal characteristics of the user are further retrieved from a customer database comprising one or more identifiers and personal characteristics for a plurality of customers; and the customer database further comprises one or more preferences for the plurality of customers, the one or more preferences including one or more specified characteristics for selecting the representative from the plurality of representatives.

27. The computer system of clauses 25 and 26, wherein the instructions further cause the system to:
analyze the obtained one or more personal characteristics to determine if the user is a customer, the customer having utilized the computing device to provide one or more preferences including one or more specified characteristics for selecting the representative from the plurality of representatives; and
utilize the one or more specified characteristics of the one or more preferences in the analysis used to select the representative if the user is determined to be a customer.

28. The computer system of clauses 25-27, wherein the instructions further cause the system to, prior to obtaining the one or more personal characteristics of the user, transmit executable instructions to the computing device utilized by the user to submit the request that, when executed by the computing device, cause the computing device to utilize the one or more components of the computing device utilized by the user for capturing visual information to obtain the one or more personal characteristics of the user.

29. The computer system of clauses 25-28, wherein the analysis of the one or more personal characteristics of the user and the one or more personal characteristics of the one or more representatives includes:
ranking the one or more representatives based at least in part on similarities between the one or more personal characteristics of the user and the one or more personal characteristics of the one or more representatives; and
utilizing a highest ranking of the one or more representatives as input for selecting the representative.

30. The computer system of clauses 25-29, wherein the instructions further cause the system to transmit a notification to a representative computing device utilized by the selected representative, the notification including information as to how the selected representative was selected.

31. The computer system of clauses 25-30, wherein the analysis of the one or more personal characteristics of the user and the one or more personal characteristics of the one or more representatives is further conducted utilizing one or more functions defined using one or more algorithms and having the one or more personal characteristics of the user and the one or more personal characteristics of the one or more representatives as input.

32. The computer system of clauses 25-31, wherein the selection of the representative from the plurality of representatives is further based at least in part on an analysis of information included in the request for assistance from the computing device utilized by the user and information about the user obtained from the computing device utilized by the user to submit the request.

33. The computer system of clauses 25-32, wherein the one or more personal characteristics of the user further comprise one or more physical characteristics of the user.

34. A computer-implemented method for providing assistance, comprising:
under the control of one or more computer systems configured with executable instructions, further obtaining one or more personal characteristics of a user in response to a request for assistance received from a user computing device utilized by a user, the one or more personal characteristics obtained from information captured by multiple sensors of the user computing device; and
selecting a representative from a plurality of representatives based at in part on an analysis of the obtained one or more personal characteristics of the user and one or more personal characteristics of one or more representatives of a plurality of representatives.

35. The computer-implemented method of clause 34, further comprising:
analyzing the obtained one or more personal characteristics of the user to determine if the user is a customer, the customer having provided one or more preferences including one or more specified characteristics for selecting the representative from the plurality of representatives; and
utilizing the one or more specified characteristics of the one or more preferences in the analysis used to select the representative if the user is determined to be a customer.

36. The computer-implemented method of clauses 34-35, wherein:
the one or more personal characteristics of the user are obtained from a customer database further comprising one or more identifiers and personal characteristics for a plurality of customers; and the customer database further comprises one or more preferences for the plurality of customers, the one or more preferences including one or more specified characteristics for selecting the representative from the plurality of representatives.

37. The computer-implemented method of clauses 34-36, further comprising transmitting one or more executable instructions to an adaptive background screen used by the selected representative that, when executed by the adaptive background screen, causes the adaptive background screen to display one or more images selected based at least in part on the one or more personal characteristics of the user.

38. The computer-implemented method of clauses 34-37, wherein the analysis further includes utilizing one or more functions defined using one or more algorithms and having the one or more personal characteristics of the user as input.

39. The computer-implemented method of clauses 34-38, wherein the instructions further include instructions that, when executed by the one or more processors, cause the computer system to:
select, based at in part on the obtained one or more personal characteristics of the user, a background; and
cause the selected background to be displayed with the selected representative on a display of the user computing device during a time when the selected representative communicates with the user via the user computing device.

40. The computer-implemented method of clauses 34-39, wherein the one or more personal characteristics of the user are further based at least in part on an avatar associated with the user.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A set of non-transitory computer-readable storage media having that stores executable instructions that, if executed by one or more processors of a computer system, cause the computer system to:
   in response to a request to provide assistance to a customer, enable a computing device associated with a representative to communicate with the customer computing device;
   during a communication session with the customer computing device, receive, from the computing device associated with the representative, one or more environment measurements from the environment where the representative has been located and determine whether the one or more environment measurements satisfy one or more requirements for the environment, including determining that there is more than one individual in the environment and by identifying that no individual in the environment appears to be the representative; and
   as a result of the one or more requirements not being satisfied during the communication with the customer computing device, enable a customer service system to take mitigating actions including triggering a notification to the computing device associated with the representative that the one or more requirements were not satisfied during the communication with the customer computing device.

2. The set of non-transitory computer-readable storage media of claim 1, wherein the mitigating actions further includes preventing the representative from being selected from a plurality of representatives in response to a further request for assistance from a further customer device fulfillable by one of the plurality of representatives.

3. The set of non-transitory computer-readable storage media of claim 1, wherein the instructions further cause the computer system to:
   receive, from a second customer computing device, a second request for assistance fulfillable by one of a plurality of service representatives;
   select the representative from the plurality of representatives;
   receive, from the computing device associated with the representative, one or more further environment measurements from the environment where the representative is located;
   determine whether the one or more further environment measurements satisfy the one or more requirements for the environment; and
   as a result of the one or more requirements being satisfied, enable a computing device associated with a representative to communicate with the second customer computing device.

4. The set of non-transitory computer-readable storage media of claim 1, wherein the one or more requirements include one or more of decibel levels, light intensity, number of individuals within the environment where the representative is located, and facial recognition of the representative.

5. A system, comprising:
   at least one network computing device configured to implement one or more services, wherein the one or more services:
   during communication with a computing device associated with a user, obtain a set of one or more measurements of an environment where a representative is located and determine whether the set of one or more measurements satisfy one or more requirements for the environment, the determining whether the set of one or more measurements satisfy one or more requirements for the environment including determining, based at least in part on the one or more measurements, that there is more than one individual in the environment and that no individual in the environment appears to be the representative; and
   as a result of the one or more requirements not being satisfied during the communication with the computing device associated with the user, enabling mitigating actions for the one or more requirements not being satisfied.

6. The system of claim 5, wherein the mitigating actions include triggering a notification to the representative computing device that the one or more requirements were not satisfied during the communication with the computing device associated with a user.

7. The system of claim 5, wherein the set of one or more measurements of the environment where the representative is located comprise one or more of facial recognition details, sound levels, global positioning system (GPS) coordinates, light intensity, and motion detection characteristics.

8. The system of claim 5, wherein the mitigating actions include termination of the communication with the computing device associated with the user.

9. The system of claim 5, wherein the communication with the computing device associated with the user includes granting the representative computing device access to customer information associated with the user, and wherein the mitigating actions include preventing the representative computing device from accessing customer information associated with the user.

10. The system of claim 5, wherein the set of one or more measurements of the environment where the representative is located are obtained via one or more of a microphone, camera, light sensor, motion sensor, and global positioning system.

11. The system of claim 5, wherein the mitigating actions include causing the representative computing device to display an informative notice indicating current issues with the environment and indicating mitigating actions being taken to prevent interaction with customers by the representative computing device.

12. A computer-implemented method for providing assistance, comprising:
   during a communication session with a computing device associated with a user, obtaining a set of one or more measurements of an environment where a representative can be located and determine whether the set of one or more measurements satisfy one or more requirements for the environment, including determining that there is more than one individual in the environment and by identifying that no individual in the environment appears to be the representative; and
   as a result of the one or more requirements not being satisfied during the communication session with the user computing device, enabling mitigating actions.

13. The computer-implemented method of claim 12, wherein the mitigating actions include disabling access to a customer database by a computing device associated with representative.

14. The computer-implemented method of claim 12, wherein the one or more requirements include one or more of decibel levels, light intensity, number of individuals within the environment, and identifiable facial features of the representative.

15. The computer-implemented method of claim 12, wherein the mitigating actions include terminating an application executing on a computing device associated with representative enabling communication with the user computing device and requiring the representative to re-initialize the application and obtain a set of one or more second measurements of the environment where the representative is located and determine whether the set of one or more second measurements satisfy the one or more requirements for the environment.

16. The computer-implemented method of claim 12, wherein the mitigating actions include causing a policy enforcement component to transmit a set of commands to a service representative environment application, which cause the application to prevent a representative computing device from interacting with any customers.

17. The computer-implemented method of claim 12, wherein the mitigating actions include obtaining a set of one or more further measurements of the environment where the representative is located and determining whether the set of one or more further measurements satisfy one or more requirements for the environment after a timeout period.

18. The computer-implemented method of claim 12, wherein the mitigating actions include displaying at a computing device associated with representative a pictographic representation of an analyses performed while determining whether the set of one or more measurements satisfy one or more requirements for the environment and an indication of the one or more requirements not being satisfied during the communication session with the user computing device.

* * * * *